(12) United States Patent
Emaminejad et al.

(10) Patent No.: US 12,521,719 B2
(45) Date of Patent: Jan. 13, 2026

(54) ELECTRONICALLY-CONTROLLED DIGITAL FERROFLUIDIC DEVICE AND METHOD FOR SCALABLE AND ADDRESSABLE BIOANALYTICAL OPERATIONS

(71) Applicant: THE REGENTS OF THE UNIVERSITY OF CALIFORNIA, Oakland, CA (US)

(72) Inventors: Sam Emaminejad, Los Angeles, CA (US); Dino Di Carlo, Los Angeles, CA (US); Wenzhuo Yu, Los Angeles, CA (US); Haisong Lin, Los Angeles, CA (US); Yilian Wang, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 899 days.

(21) Appl. No.: 17/770,959

(22) PCT Filed: Oct. 21, 2020

(86) PCT No.: PCT/US2020/056678
§ 371 (c)(1),
(2) Date: Apr. 21, 2022

(87) PCT Pub. No.: WO2021/081103
PCT Pub. Date: Apr. 29, 2021

(65) Prior Publication Data
US 2022/0379309 A1 Dec. 1, 2022

Related U.S. Application Data

(60) Provisional application No. 62/924,505, filed on Oct. 22, 2019.

(51) Int. Cl.
*B01L 3/00* (2006.01)
*G01N 15/1031* (2024.01)
(Continued)

(52) U.S. Cl.
CPC ..... *B01L 3/502761* (2013.01); *B01L 3/50273* (2013.01); *G01N 15/1031* (2013.01);
(Continued)

(58) Field of Classification Search
CPC ......... B01L 3/502761; B01L 2400/043; B01L 3/502792; B01L 2200/0652;
(Continued)

(56) References Cited

U.S. PATENT DOCUMENTS 8,940,147 B1  1/2015 Bartsch et al.
2002/0106314 A1* 8/2002 Pelrine .................. B01L 3/0293
422/186

(Continued)

FOREIGN PATENT DOCUMENTS

WO  WO 2008/036997 A1  4/2008
WO  WO 2017/066102 A1  4/2017

OTHER PUBLICATIONS

Partial supplementary European search report under Communication pursuant to Rule 164(1) EPC dated Nov. 8, 2022 for European Patent Appl.No. 20880307.2-1101, (13 pages).
(Continued)

*Primary Examiner* — Dean Kwak
(74) *Attorney, Agent, or Firm* — VISTA IP LAW GROUP LLP

(57) ABSTRACT

An electronically-controlled digital ferrofluidic device is disclosed which employs a network of individually addressable coils in conjunction with one or more movable permanent magnets, where each moveable permanent magnet delivers the designated fluid manipulation-based tasks. The
(Continued)

underlying mechanism facilitating fluidic operations is realized by addressable electromagnetic actuation of miniaturized mobile magnets that exert localized magnetic body forces on droplets filled with magnetic nanoparticles. The reconfigurable, contactless, and non-interfering magnetic-field operation properties of the underlying actuation mechanism allow for the integration of passive and active components to implement advanced and diverse operations with high efficiency (e.g., droplet sorting, dispensing, generation, merging, mixing, filtering, and analysis).

16 Claims, 25 Drawing Sheets

(51) Int. Cl.
    *G01N 15/14*     (2006.01)
    *G01N 15/1404*     (2024.01)
    *G01N 15/1433*     (2024.01)
    *G01N 15/149*     (2024.01)
    *G01N 15/10*     (2006.01)

(52) U.S. Cl.
    CPC ..... *G01N 15/1404* (2013.01); *G01N 15/1433* (2024.01); *G01N 15/1484* (2013.01); *B01L 2200/0652* (2013.01); *B01L 2300/0645* (2013.01); *B01L 2300/0654* (2013.01); *B01L 2300/0819* (2013.01); *B01L 2400/043* (2013.01); *G01N 2015/1006* (2013.01); *G01N 2015/1422* (2013.01); *G01N 15/149* (2024.01); *G01N 2015/1493* (2013.01)

(58) Field of Classification Search
    CPC ..... B01L 2200/0673; B01L 2300/0645; B01L 2300/0816; B01L 2300/0819; B01L 2300/0851; B01L 3/502707; B01L 3/50273; B01L 2300/0654; G01N 15/1023; G01N 15/1031; G01N 15/1404; G01N 15/1433; G01N 15/1484; G01N 15/149; G01N 2015/1006; G01N 2015/1422; G01N 2015/1493; G01R 33/24; G01R 33/341; G01R 33/385; G01R 33/3415
    See application file for complete search history.

(56) References Cited

U.S. PATENT DOCUMENTS

| | | |
|---|---|---|
| 2002/0164819 A1 | 11/2002 | Storek et al. |
| 2006/0292013 A1 | 12/2006 | Love et al. |
| 2013/0139565 A1 | 6/2013 | Hedtke et al. |
| 2015/0257306 A1 | 9/2015 | Glew et al. |
| 2017/0002846 A1 | 1/2017 | Prakash et al. |

OTHER PUBLICATIONS

Vijay Srinivasan et al., An integrated digital microfluidic lab-on-a-chip for clinical diagnostics on human physiological fluids, Lab Chip, 2004, 4, 310-315.
Tomohiro Taniguchi et al., Chemical reactions in microdroplets by electrostatic manipulation of droplets in liquid media, Lab Chip, 2002, 2, 19-23.
Alexander Y. Trick et al., A Portable Droplet Magnetofluidic Platform for Automated RNA Quantification and Analysis, Transducers 2017, Kaohsiung, Taiwan, Jun. 18-22, 2017 (4 pages).
PCT International Preliminary Report on Patentability (Chapter I of the Patent Cooperation Treaty) for PCT/US2020/056678, Applicant: The Regents of the University of California, Form PCT/IB/326 and 373, dated May 5, 2022 (5 pages).
PCT International Search Report for PCT/US2020/056678, Applicant: The Regents of the University of California, Form PCT/ISA/210 and 220, dated Jan. 26, 2021 (3 pages).
PCT Written Opinion of the International Search Authority for PCT/US2020/056678, Applicant: The Regents of the University of California, Form PCT/ISA/237, dated Jan. 26, 2021 (3 pages).
Biddut Bhattacharjee et al., Electrocoalescence based serial dilution of microfluidic droplets, Biomicrofluidics 8, 044111 (2014).
L. Chen et al., Digital microfluidics chip with integrated intra-droplet magnetic bead manipulation, Microfluid Nanofluid (2015) 19:1349-1361.
Liji Chen et al., Cell Manipulation and Detection Enhancement Enabled by a Microelectromagnet Integrated with a Digital Microfluidic Device, (2018), Biosens Bioelectron Open Acc: BBOA-145. DOI: 10.29011/ 2577-2260. 100045.
Yinuo Cheng et al., High-throughput and clogging-free microfluidic filtration platform for on-chip cell separation from undiluted whole blood, Biomicrofluidics 10, 014118 (2016).
Jian Gong et al., All-Electronic Droplet Generation On-Chip With Real-Time Feedback Control for Ewod Digitial Microfluidics, Lab Chip. Jun. 2008 ; 8(6): 898-906. doi:10.1039/b717417a.
U. Lehmann et al., Magnetic On-Chip DNA Extraction in a Droplet Based Microsystem, https://www.researchgate.net/publication/37440967 (2006).
Jun-tao Li et al., Design Optimization of Amazon Robotics, Automation, Control and Intelligent Systems 2016; 4(2): 48-52.
Dhiman Mallick et al., Magnetic performances and switching behavior of Co-rich CoPtP micro-magnets for applications in magnetic MEMS, Journal of Applied Physics 125, 023902 (2019); doi: 10.1063/1.5063860.
Marcel Mibus et al., Performance and Reliability of Electrowetting-on-Dielectric (EWOD) Systems Based on Tantalum Oxide, ACS Appl. Mater. Interfaces 2017, 9, 42278-42286.
Elizabeth M. Miller et al., A Digital Microfluidic Approach to Homogeneous Enzyme Assays, Anal. Chem. 2008, 80, 1614-1619.
Juergen Pipper et al., Clockwork PCR Including Sample Preparation, Angew. Chem. Int. Ed. 2008, 47, 3900-3904.
Xiaolong Qiu et al., Microfluidic filter device with nylon mesh membranes efficiently dissociates cell aggregates and digested tissue into single cells, Lab Chip. Sep. 11, 2018; 18(18): 2776-2786. doi:10.1039/c8lc00507a.
Saman Sadeghi et al., On chip droplet characterization: A practical, high-sensitivity measurement of droplet impedance in digital microfluidics, Anal. Chem. 2012, 84, 1915-1923.
Dong Jin Shin et al., Sample-to-Answer Droplet Magnetofluidic Platform for Point-of-Care Hepatitis C Viral Load Quantitation, Scientific Reports | (2018) 8:9793 | DOI:10.1038/s41598-018-28124-3.
Ramakrishna S. Sista et al., Heterogeneous Immunoassays Using Magnetic beads On a Digital Microfluidic Platform, Lab Chip. Dec. 2008 ; 8(12): 2188-2196. doi:10.1039/b807855f.
Alejandro Stark et al., A sample-to-answer droplet magnetofluidic assay platform for quantitative methylation-specific PCR, Biomed Microdevices. ; 20(2): 31. doi:10.1007/s10544-018-0276-6.
Joshua D. Tice et al., Formation of Droplets and Mixing in Multiphase Microfluidics at Low Values of the Reynolds and the Capillary Numbers, Langmuir 2003, 19, 9127-9133.
Aaron R. Wheeler et al., Electrowetting-Based Microfluidics for Analysis of Peptides and Proteins by Matrix-Assisted Laser Desorption/Ionization Mass Spectrometry, Anal. Chem. 2004, 76, 4833-4838.
Bing Wu et al., Rapid Chemical Reaction Monitoring by Digital Microfluidics-NMR: Proof of Principle Towards an Automated Synthetic Discovery Platform, Angew. Chem. Int. Ed. 2019, 58, 15372-15376.
Yi Zhang et al., Magnetic digital microfluidics—a review, Lab Chip, 2017, 17, 994.

\* cited by examiner

ELECTRONICALLY-CONTROLLED DIGITAL FERROFLUIDIC DEVICE AND METHOD FOR SCALABLE AND ADDRESSABLE BIOANALYTICAL OPERATIONS

RELATED APPLICATION

This Application is a U.S. National Stage filing under 35 U.S.C. § 371 of International Application No. PCT/US2020/056678, filed on Oct. 21, 2020, which claims priority to U.S. Provisional Patent Application No. 62/924,505 filed on Oct. 22, 2019, which are hereby incorporated by reference in its entirety. Priority is claimed pursuant to 35 U.S.C. §§ 119, 371 and any other applicable statute.

STATEMENT REGARDING FEDERALLY SPONSORED RESEARCH AND DEVELOPMENT

This invention was made with government support under Grant Number 1160504, awarded by the National Science Foundation. The government has certain rights in the invention.

TECHNICAL FIELD

The technical field generally relates to digital fluidic platforms. More specifically, the technical field relates to a digital fluidic platform that uses the electronic actuation of individual coils formed on or in a substrate to impart magnetic fields on magnetic droplets. The digital fluidic platform may be used to implement a number of different operations including, droplet generation, droplet transport, droplet dispensing, droplet mixing, droplet sorting, and droplet analysis.

BACKGROUND

There is growing use of microfluidic based systems in a variety of biological applications such as drug development, disease diagnosis, and nucleic acid characterization, all of which require diverse large-scale, and small-volume fluid handling capabilities to perform a plethora of simultaneous sample processing tasks such as sample transportation, mixing, dispensing and filtration, and sample analysis tasks such as electrochemical and optical sensing. To this end, conventional continuous-flow microfluidic systems have shown robust and versatile fluid handling capabilities. However, their predefined fluid pathways (typically driven by microfluidic channels) and sequential operation severely limit their functional flexibility, which imposes the same limitations as conveyor-belt systems within larger scale settings. Moreover, digital microfluidic actuation techniques such as electrowetting-on-dielectric (EWOD) can transport discrete droplets on an open-surface to perform multi-step bioanalytical operations for point-of-care diagnostics and on-demand synthesis. However, the inherent limitations of EWOD, which stem from its surface interaction mechanism, drastically restrict its service life, operating dimensions, and compatibility with other peripheral components, thus limiting its application diversity. There thus is a need for microfluidic platforms and systems that enable the controlled manipulation of fluid volumes or droplets over surfaces which do not have the limitations of EWOD-based devices.

SUMMARY

In one embodiment, an electronically-controlled digital ferrofluidic device (sometimes referred to herein as a ferrobotic system) is used to execute and automate diverse fluidic tasks. The underlying actuation mechanism is realized by combining an electromagnetic induction-coil matrix as the navigation floor, and one or more intermediate permanent magnet(s), which are moveable over and controlled by the navigation floor, that provides addressable amplified magnetic fields at targeted two-dimensional locations (i.e., in an x, y plane over the floor). The intermediate permanent magnets enable the manipulation of nanoliter or microliter volumes of magnetic nanoparticle-containing droplets which are used as carriers that transport or carry cargo. The magnetic nanoparticles are biocompatible. The ferrofluidic device demonstrates robust transportation of nanoscale and microscale cargo over at least 24 hours of continuous operation. The contactless fluid manipulation and ability to use other fields orthogonal to magnetic fields enables not only basic transportation tasks, but also advanced tasks such as droplet generation, dispensing, merging, and filtration following the integration of various disposable fluidic components. Additionally, the programmable navigation floor allows the system to employ a network of individually addressable "robots" to achieve cross-collaborative objectives such as droplet sorting in a time-efficient manner, further demonstrating the teamwork potential of the ferrobotic system.

The ferrofluidic device has been used to actuate and analyze human physiological samples. The disclosed architecture of a fully automated system is used to analyze the activity of matrix metallopeptidases (MMP) from human plasma samples on a monolithic device. Measurement results that match those obtained using conventional plate readers and manual operations as reference demonstrate the compatibility with biological assays and potential of the ferrofluidic device to be adapted for high-throughput complex analytical processes.

The ferrofluidic device, in one embodiment, consists of a plurality of scalable components, preferably at the millimeter scale (less preferably at the 100 micrometer scale or the centimeter scale) including: (1) an addressable electromagnetic (EM) navigation floor, which can selectively establish localized EM fields by passing DC currents in a coil matrix with individual coils located at discrete locations along the floor; (2) a moveable permanent magnetic (e.g., a permanent rare earth magnet) which moves laterally in a plane substantially parallel to the plane of the navigation floor in response to the magnetic field induced by the coils (while amplifying the field that manipulates the carrier); (3) a ferrofluidic carrier, which mixes with the target bio-package (below) and traverses within the device substantially parallel to the plane of the navigation floor with the aid of the moveable permanent magnet; and (4) the bio-package, which consists of sample(s) or chemical reagents or other fluids that are mixed with the carrier.

In one embodiment, a ferrofluidic device includes a first substrate having a plurality of individually addressable coils formed therein or thereon (e.g., a printed circuit board or (PCB)). A second substrate comprising one or more enclosed channels, chambers, regions, zones, or wells formed therein is disposed adjacent to the first substrate. In related embodiments, the second substrate comprises channels, chambers, regions, zones, or wells therein that are open (or at least partially open) on a top surface that enable easy access to add or remove reagents or fluids. One or more permanent magnets are interposed in a gap region formed between the first substrate and the second substrate. A power source and control circuitry are electrically connected to the individually addressable coils and are configured to selectively actuate one or more of the individually addressable coils. Software or a script may be used to control the power source and/or control circuitry to perform a series of unit operations in the ferrofluidic device. These unit operations may be performed as part of a sequence of operations that are used to accomplish one or more desired tasks.

In another embodiment, a method of using the ferrofluidic device includes loading one or more of the channels, chambers, regions, zones, or wells with one or more volumes of ferrofluid and actuating one or more of the plurality of individually addressable coils to move the one or more permanent magnets to perform one or more unit operations on the one or more volumes of ferrofluid selected from the group consisting of: moving the one or more volumes of ferrofluid across a surface of the second substrate, forming a plurality of smaller volumes of ferrofluid, splitting of the one or more volumes of ferrofluid, merging the one or more volumes of ferrofluid with a second volume of ferrofluid, mixing the one or more volumes of ferrofluid, diluting the one or more volumes of ferrofluid with another fluid, filtering the one or more volumes of ferrofluid. The method may further involve the analysis of the one or more volumes of ferrofluid. For example, the volumes of ferrofluid (i.e., droplets) may be located in detection regions/wells and then optically interrogated with, for example, an imaging device such as a fluorescence microscope. Of course, other modes and manners of interrogation may be used instead of fluorescence. For example, colorimetric analysis may be used in some embodiments. Other embodiments may use different sensing and/or analysis techniques (e.g., electrochemical, impedance, etc.).

DETAILED DESCRIPTION OF THE ILLUSTRATED EMBODIMENTS

Figure 1A:
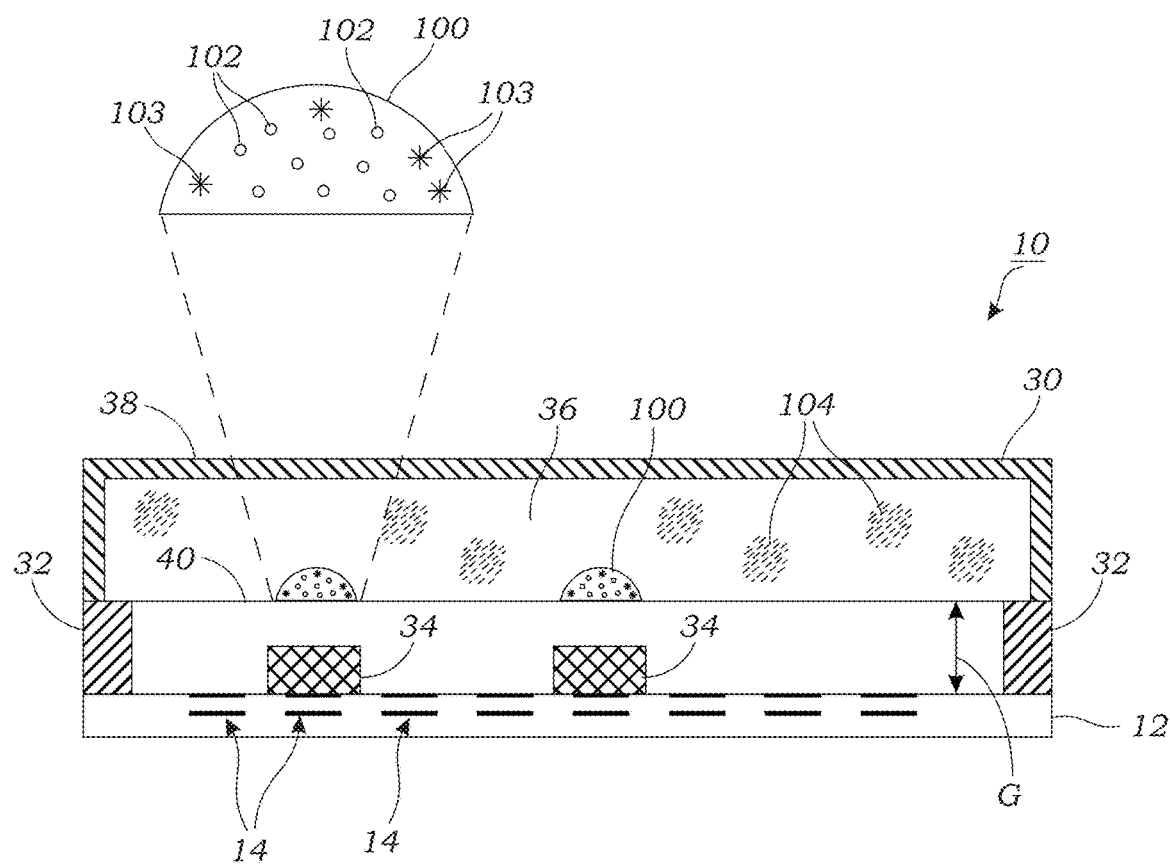
FIG. 1A illustrates a cross-sectional view of a ferrofluidic fluid handling device according to one embodiment.

FIG. 1A illustrates a cross-sectional view of a digital ferrofluidic fluid handling device 10 according to one embodiment. The ferrofluidic fluid handling device 10 is "digital" in the sense that it creates, manipulates, and operates on discrete volumes or droplets of ferrofluid 100 contained within the ferrofluidic fluid handling device 10. A ferrofluid is a liquid fluid that is magnetic due to the presence of small (e.g., nanometer-sized) magnetic particles 102 suspended in a carrier fluid. The volumes or droplets of ferrofluid 100 may also contain a package 103 that may be sample, reagent, or the like. The package 103 may be a biological material resulting in a bio-package 103.

Figure 1B:
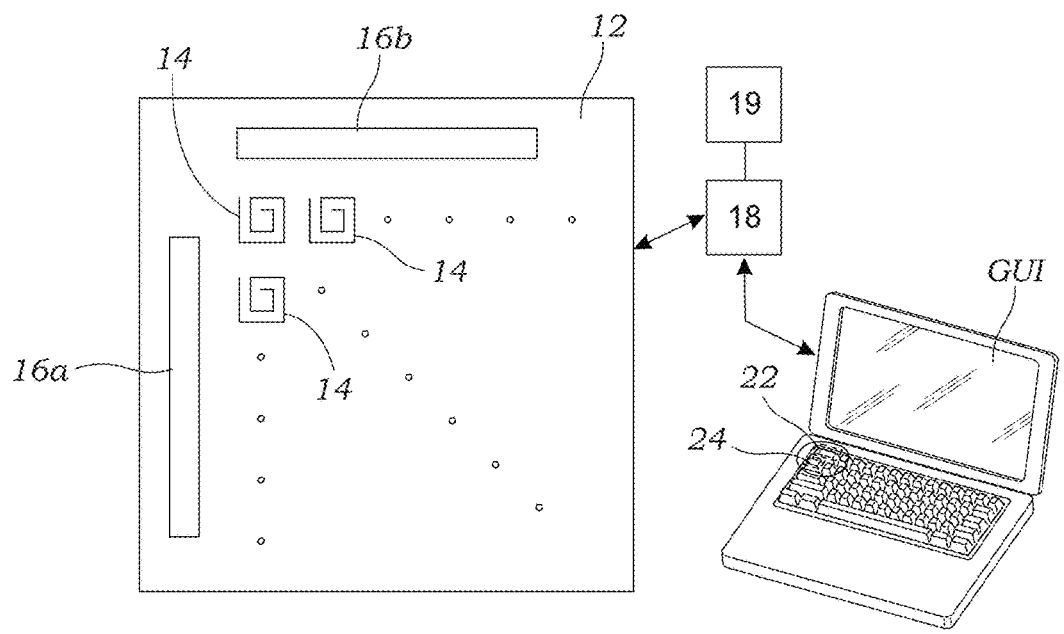
FIG. 1B illustrates a plan view of the first substrate (i.e., printed circuit board (PCB) according to one embodiment along with associated control electronics.

The ferrofluidic fluid handling device 10 includes a first substrate 12 that has a plurality of individually addressable coils 14 formed therein or thereon. The individually addressable coils 14 operate as an electromagnet (EM) when actuated. This first substrate 12 acts as a navigation floor as explained herein. The first substrate 12 may, in one preferred embodiment, be a printed circuit board (PCB) that includes the plurality of individually addressable coils 14 formed therein. In one preferred embodiment, the first substrate 12 is formed from a multi-layer PCB where the plurality of individually addressable coils 14 are formed as spirals with different layers of the PCB 12 containing additional spirals of the coil structure (e.g., three different layers for the spiral structure). FIG. 1B illustrates a plan view of the navigation floor or PCB 12 according to one embodiment. The plurality of individually addressable coils 14 are formed as an array or matrix on the PCB 12 with individual addressable coils 14 formed in rows and columns, although other configurations may be used. The number of individual addressable coils 14 may vary. In the experiments described herein, the coil matrix included an array of 32×32 individually addressable coils 14. Of course, this number may vary depending on the size of the overall ferrofluidic fluid handling device 10, size of individual addressable coils 14, pitch between adjacent coils 14, etc.

Figure 4A:
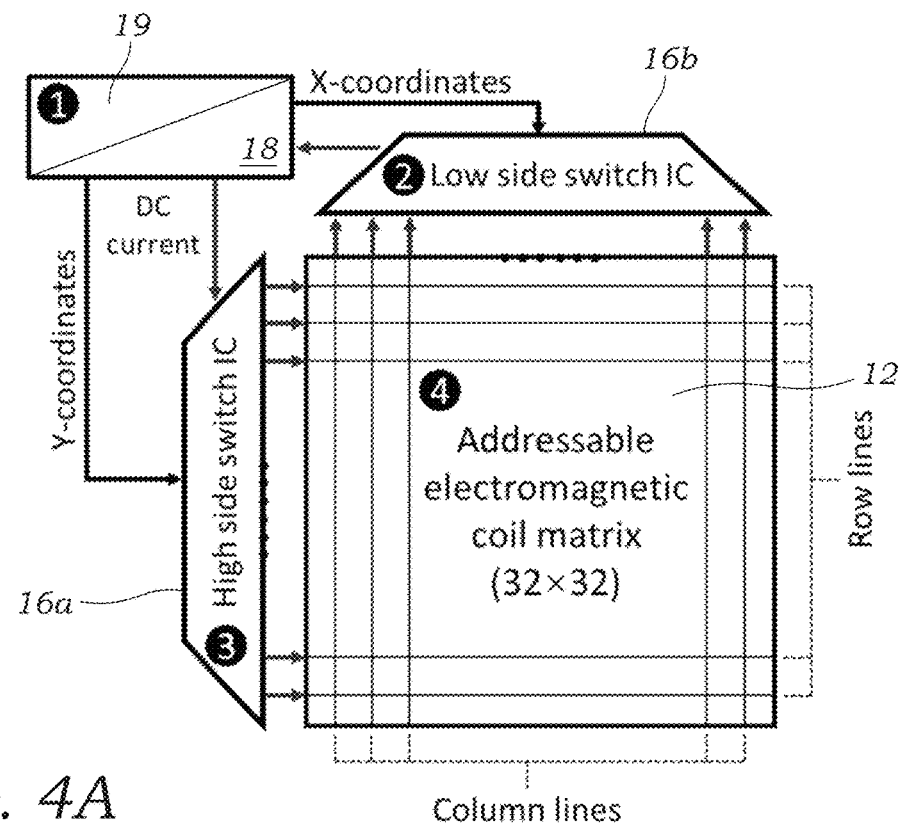
FIG. 4A illustrates a schematic diagram of the control circuitry used to actuate the individually addressable coils on the PCB.
Figure 8A:
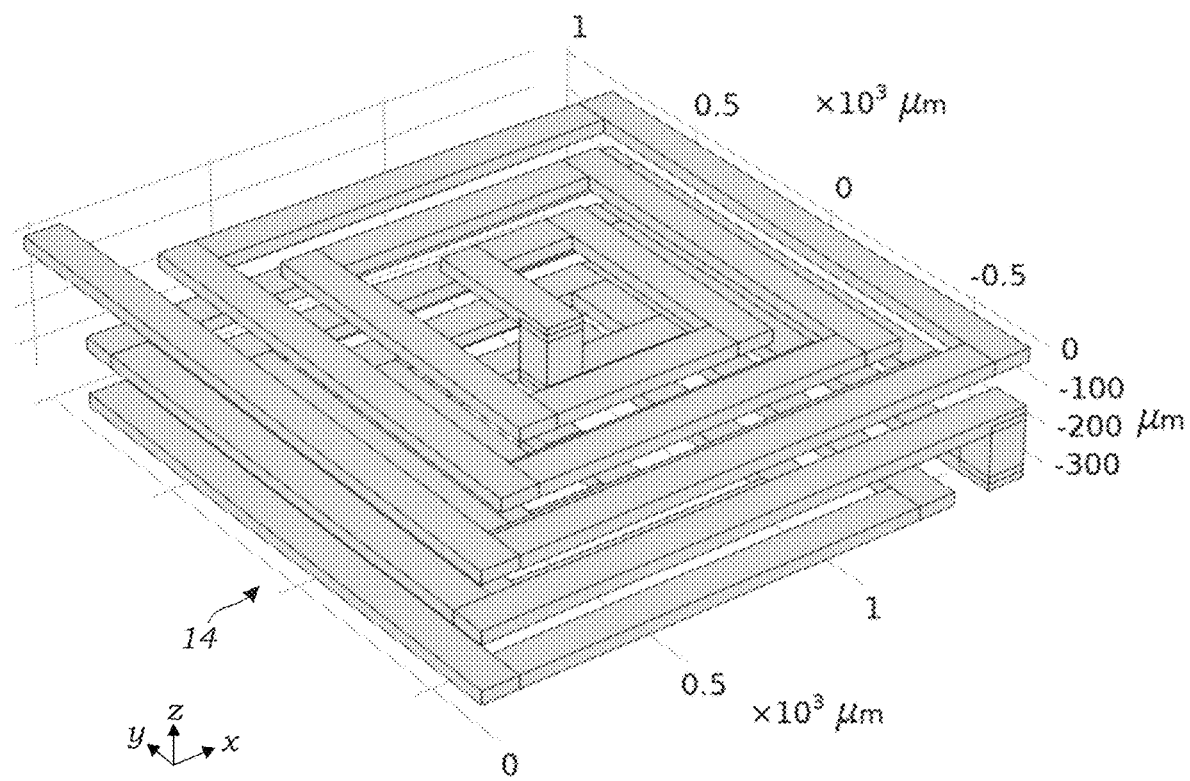
FIG. 8A-8C illustrate, respectively, a perspective (FIG. 8A), top (FIG. 8B) and side (FIG. 8C) view of the EM-coil's geometry according to one embodiment. Note that dimensions are illustrative only.
Figure 8B:
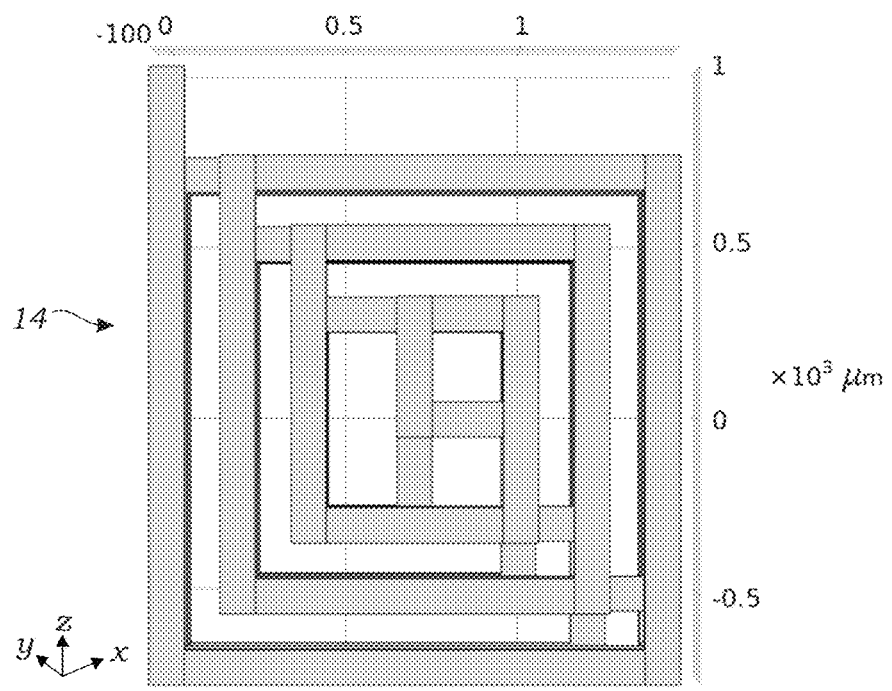
Figure 8C:
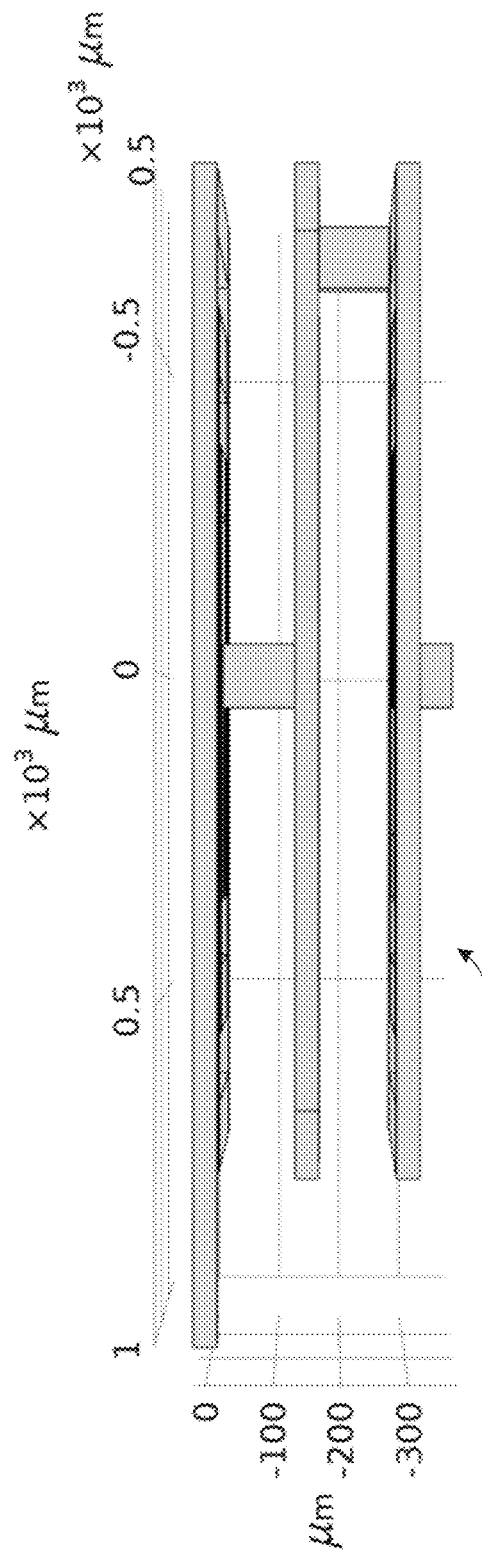

For example, in the experiments described herein, each individual addressable coil 14 had a three-turn configuration with a size of 1.5×1.5 mm stacked in three layers in the PCB 12 (FIGS. 8A-8C). Adjacent coils 14 were separated by a gap of 0.1 mm. This produced a working area on the first substrate 12 of around 51×51 mm. As best seen in FIGS. 1B and 4A, the first substrate 12 includes, in one embodiment, a first IC switch 16a and a second IC switch 16b. The first and second IC switches 16a, 16b may be directly integrated on the PCB 12. The IC switches 16a, 16b are used to select and actuate or power individual addressable coils 14. For example, the first IC switch 16a may be used for row selection (e.g., MAX14662 (Maxim Integrated, CA, USA)) while the second IC switch 16b is used for column selection (e.g., MC33996 (NXP semiconductor, Netherlands).

Figure 4B:
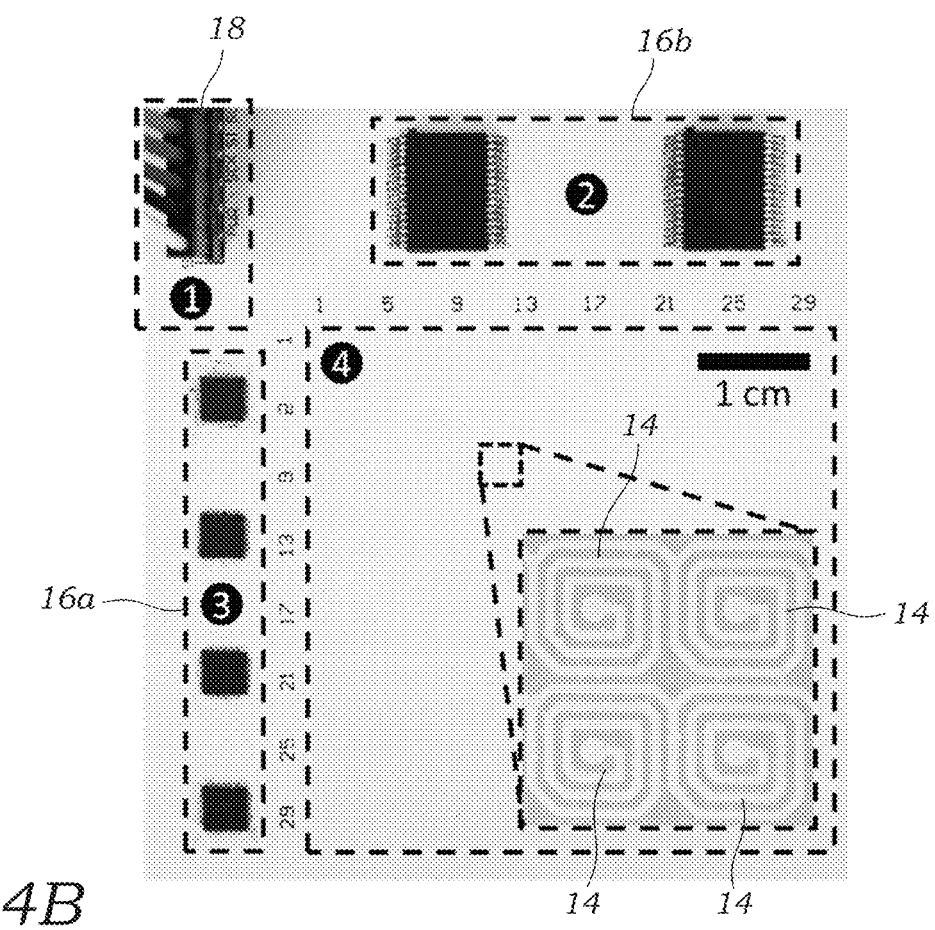
FIG. 4B is an optical image of the implemented control circuitry and the PCB navigation floor with the close-up view of four neighboring EM coils.

Still referring to FIG. 1B, the first and second IC switches 16a, 16b are connected to and controlled by a microcontroller unit (MCU) 18 which acts as the control circuitry for actuating coils 14. A serial peripheral interface (SPI) may connect the first and second IC switches 16a, 16b to the MCU 18. Depending on the task at hand, and by programming at the MCU 18 level, the coils 14 can be sequentially and/or simultaneously activated to perform the desired unit operation or task as described herein. The MCU 18 may be located on-board the PCB 12 (FIG. 4B) or it may be located separate from the PCB 12. The MCU 18 may itself be operably connected to a computing device 20 (e.g. personal computer, laptop, tablet PC, mobile phone) using, for example, a serial communication. The computing device 20 includes software 22 executed by one or more processors 24 that are used to program the sequencing and timing of actuation of the individually addressable coils 14. Target coordinates (i.e., target coils 14) are pre-programmed or sent from the computing device 20 are translated to SPI commands by the MCU 18, then transmitted to the first and second switch ICs 16a, 16b for addressable activation of the coils 14.

The individual addressable coils 14 are coupled to a power source through the first and second switch ICs 16a, 16b to apply a direct current (DC) to the actuated coils 14 (around 0.2A). This may be provided using an external power supply 19. An example of the external power supply 19 includes the Keithley 2230-30-1 available from Tektronix, OR, USA, although it should be appreciated that other power supplies may be used. The power supply 19 may even be battery powered.

The software 22 may include a graphical user interface (GUI) that is used by the user to program the sequencing and timing of actuation of the individually addressable coils 14. In one aspect, the user may program the sequencing by selecting various operations that are desired be performed. An example, would be to move or transport a volume or droplet of ferrofluid 100 from point A to point B. Another example would be to create "child" droplets 100c from a "parent" droplet 100p (illustrated in FIG. 2 in droplet generation operation). The software 22 would then automatically generate the sequence (and timing) of which coils 14 to activate to accomplish this task. In this regard, the user can easily program the desired workflow by stringing together a series of discrete operations (or sub-operations) to accomplish the desired task. Examples including, by way of illustration and not limitation, moving or transporting the one or more volumes of ferrofluid 100 (illustrated in FIG. 2 moving volume of ferrofluid 100 in direction of arrows B), forming a plurality of smaller volumes of ferrofluid 100c (illustrated in FIG. 2 in droplet generation operation and also in dispensing operation), splitting of one or more volume of ferrofluid 100, merging one or more volumes of ferrofluid 100 with a second volume of ferrofluid 100 (illustrated in FIG. 2 as two volumes of ferrofluid 100 merging in direction of arrows A using electrodes 60), mixing one or more volumes of ferrofluid 100, diluting one or more volumes of ferrofluid 100 with another fluid, filtering one or more volumes of ferrofluid 100 (illustrated in FIG. 2 in filtration operation), removing one or more volumes of ferrofluid 100 or the like.

Referring back to FIG. 1A, a second substrate 30 is disposed adjacent to the first substrate 12. The second substrate 30 is, in one preferred embodiment, a microfluidic chip that contains the volumes of ferrofluid 100 that are manipulated as described herein. The second substrate 30 is disposed adjacent to the first substrate 12 and separated by a gap (G). Spacers 32 are optionally used to control the gap (G) distance. As seen in FIG. 1A. the second substrate 30 generally lies in a plane that is substantially parallel to the plane of the first substrate 12. One or more permanent magnets 34 are interposed in the gap region formed between the first substrate 12 and the second substrate 30. The permanent magnets 34 preferably comprise rare earth magnets but may also include metallic materials or composite magnetic materials (e.g., ceramic or ferrite), or other materials commonly used for permanent magnets.

The dimensions of the permanent magnets 34 may vary depending on the particular ferrofluidic fluid handling device 10 but are generally millimeter-sized permanent magnets. In experiments conducted herein, the permanent magnets 34 had a height or thickness of 0.8 mm and 2.54 mm diameter (cylindrically shaped). In some embodiments, the width or diameter of the permanent magnets 34 may be about the same or less than the width or diameter of a single coil 14. In other embodiments, the width or diameter of the permanent magnets 34 may be larger than the width or diameter of a single coil 14 thus overlapping multiple coils 14. The gap (G) that is formed between the first substrate 12 and the second substrate 30 is preferably kept just larger than the height or thickness of the permanent magnets 34. For example, a gap (G) height of around 1 mm accommodates the 0.8 mm thick permanent magnets 34. As explained herein, preferably there are a plurality of permanent magnets 34 located in the gap as each is used to perform various tasks and unit operations. The use of multiple permanent magnets 34 allows for parallel processing of the volumes of ferrofluid 100 to take place in the second substrate or microfluidic chip 30.

The second substrate or microfluidic chip 30 contains the working area of the ferrofluidic fluid handling device 10 and contains the volumes of ferrofluid 100 where the digital operations take place. The volumes of ferrofluid 100, as explained herein, are preferably in the form of droplets 100. The volumes of ferrofluid 100 contain therein magnetic particles 102. The magnetic particles 102 are preferably biocompatible and, in some embodiments, are nanoparticles. Examples of commercially available ferrofluids that include magnetic particles 102 include ferumoxytol (AMAG Pharmaceuticals, MA, USA). Some of the volumes of ferrofluid or droplets 100 also include therein a biological or chemical sample of interest that act as the "package" 103 (e.g., bio-package 103) within the droplets 100. The volumes of ferrofluid or droplets 100 may also include reagents, wash solutions, and the like. The volumes of ferrofluid or droplets 100 move within the second substrate or microfluidic chip 30 in response to the strong body forces originating from the interaction of magnetic particles 102 within the volumes of ferrofluid or droplets 100 with the magnetic actuation field created by the individually addressable coils 14 and amplified by the permanent magnet 34.

With reference to FIG. 1A, the second substrate or microfluidic chip 30 includes one or more channels, chambers, regions, zones, or wells 36 formed therein. For example, in one embodiment (e.g., FIGS. 7A and 7B), the second substrate or microfluidic chip 30 may include one or more input wells 36a that are used to input a sample (e.g., input well 36a) along with other wells 36b that are used to hold calibration sources (e.g., source wells 36b). The second substrate or microfluidic chip 30 further includes calibration wells 36c that hold various concentrations of calibrating solution. An output well 36d is provided that holds a volume(s) of ferrofluid 100 that contains the sample along with other reagents for fluorescent light generation. A waste chamber 36e is provided that accepts waste. The central region 36f of the second substrate or microfluidic chip 30 includes an open area that permits easy lateral travel of the volumes of ferrofluid 100 across the surface of the second substrate or microfluidic chip 30. This allows volumes or droplets of ferrofluid 100 to move between different physical locations of the second substrate or microfluidic chip 30. With reference to FIGS. 2, 5A, 7B, 7C, a wall on one side of the second substrate or microfluidic chip 30 includes a corrugated wall region 36g with openings that are used to create controlled sizes/volumes of ferrofluid 100. As a larger "parent" volume or droplet of ferrofluid 100p passes over the corrugated wall region 36g, smaller "child" volumes or droplets of ferrofluid 100c are formed. The size(s) of the child volumes or droplets of ferrofluid 100c can be controlled by the size of the openings in the corrugated wall region 36g. These may uniform or non-uniform.

The volumes or droplets of ferrofluid 100 are surrounded by a filler fluid 104. Typically, the volumes or droplets of ferrofluid 100 are aqueous-based and the filler fluid 104 is an oil-based filler. An example includes fluorinated oil such as Novec™ 7500 Engineered Fluid, 3M, MN, USA. An optional surfactant may also be added to the filler 104 (e.g., Pico-Surf™ 1, Sphere Fluidics, NJ, USA). In some embodiments, where operations are conducted over a shorter time period or where evaporation is mitigated, an external filling fluid such air or other gas may be used. In other embodiments, the volumes or droplet of ferrofluid 100 may be oil-based with the filler fluid 104 being an aqueous-based filler.

The second substrate or microfluidic chip 30 may be formed as a laminate structure that is formed by multiple layers of a polymer that are adhered to each other using an adhesive or tape with adhesive backing. For example, polyethylene terephthalate (PET) film sheets may be used with double-sided tape to form the laminate structure. Additional materials such as plastics or polymer materials or glass may be used. The channels, chambers, regions, zones, or wells 36 as well as vias or holes 42 can be created using laser-cutting. In some embodiments, electrodes may be deposited or patterned prior to assembly. The second substrate or microfluidic chip 30 includes a top surface 38 and a bottom surface 40. The bottom surface 40 typically does not have any openings therein as it forms the floor on which the volumes or droplets of ferrofluid 100 move. The top surface 38 may be closed, open, or partially open. For example, openings in the top surface 38 may be used to deposit fluid samples and/or reagents into the channels, chambers, regions, zones, or wells 36. Likewise, openings may be used to remove fluid from the ferrofluidic fluid handling device 10 (e.g., waste chamber 36e of FIGS. 7B and 7C).

Figure 2:
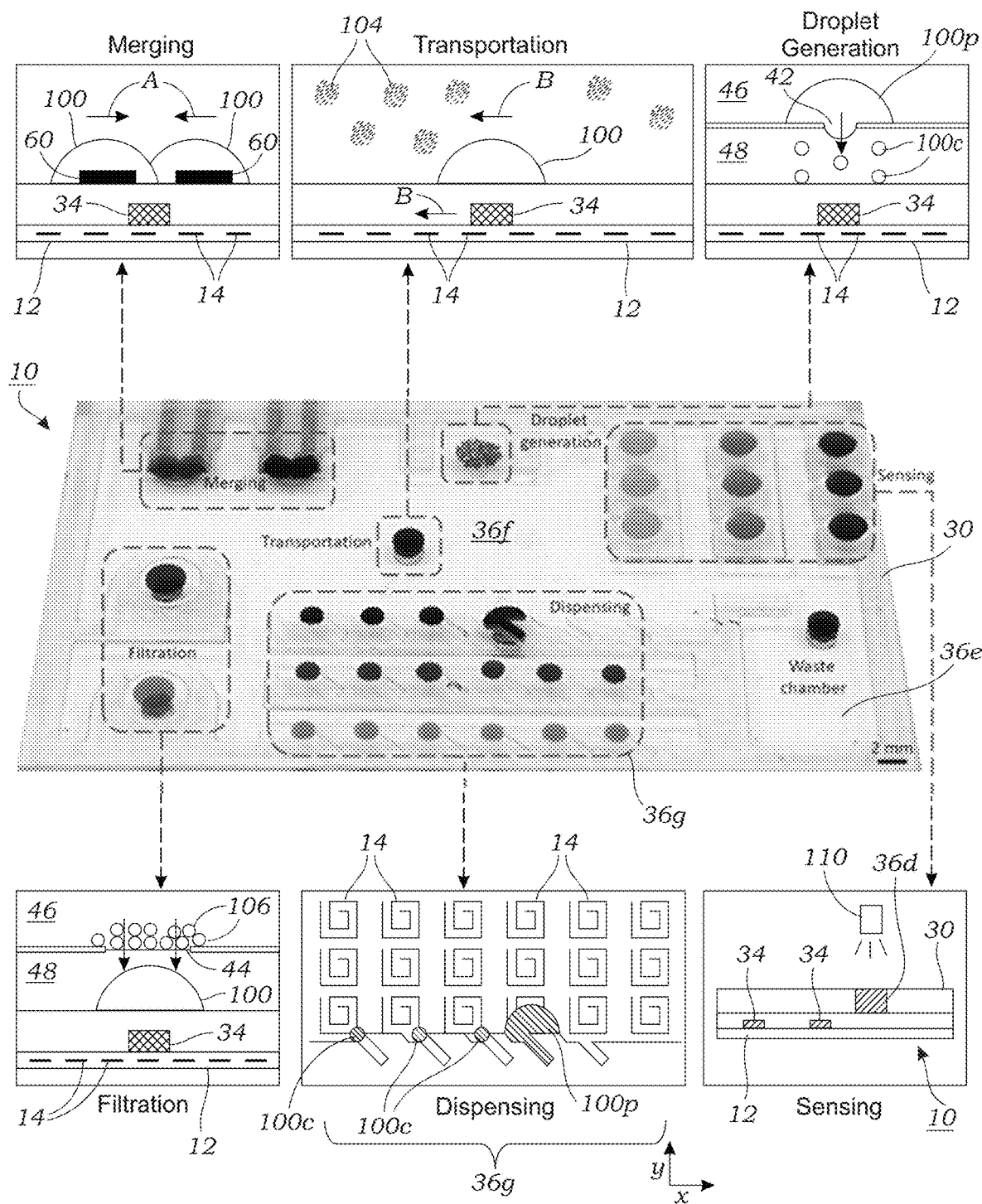
FIG. 2 illustrates one embodiment of a ferrofluidic fluid handling device and the mechanism of operation. An image of the ferrofluidic fluid handling device is shown along with illustrations of different unit operations performed on the device. These include droplet merging, droplet transportation, droplet generation, droplet filtration, dispensing, and sensing.

In some embodiments, a via or hole 42 is formed in the top surface 38 and used to load a sample or reagents into the second substrate or microfluidic chip 30 such as that illustrated in FIG. 2 (droplet generation operation). The via or hole 42 may also contain a filter media 44 which is used to filter the volume or droplet of ferrofluid 100 as seen in FIG. 2 (filtration operation). In addition, in some embodiments, the second substrate or microfluidic chip 30 may contain a multi-layered structure with an upper chamber 46 separated by a lower chamber 48 (e.g., droplet generation and filtration in FIG. 2). The two chambers 46, 48 are separated from one another except for one or more vias or holes 42 that extend between the two chambers 46, 48. These one or more vias or holes 42 may be used to generate smaller sized volumes of ferrofluid 100 in the lower chamber 48 from a parent droplet that is located in the upper chamber 46. Magnetic attraction caused by actuation of the coil(s) 14 and permanent magnet 34 pulls the fluid through the vias or holes 42 and creates the smaller-sized volumes of ferrofluid 100. This same arrangement may also be used to filter a volume or droplet of ferrofluid 100. In this embodiment, filter media 44 is located in the vias or holes 42 and the volume or droplet of ferrofluid 100 is then pulled through the vias or holes 42 where larger particles or objects 106 cannot pass through the filter media 44.

The ferrofluidic fluid handling device 10 described herein may be scaled in size to span a wide range of fluid volumes. The ferrofluidic fluid handling device 10 may include microfluidic devices as well as larger millifluidic devices 10. In this regard, the coils 14 and permanent magnets 34 may have dimensions in the millimeter or centimeter scale.

Figure 3:
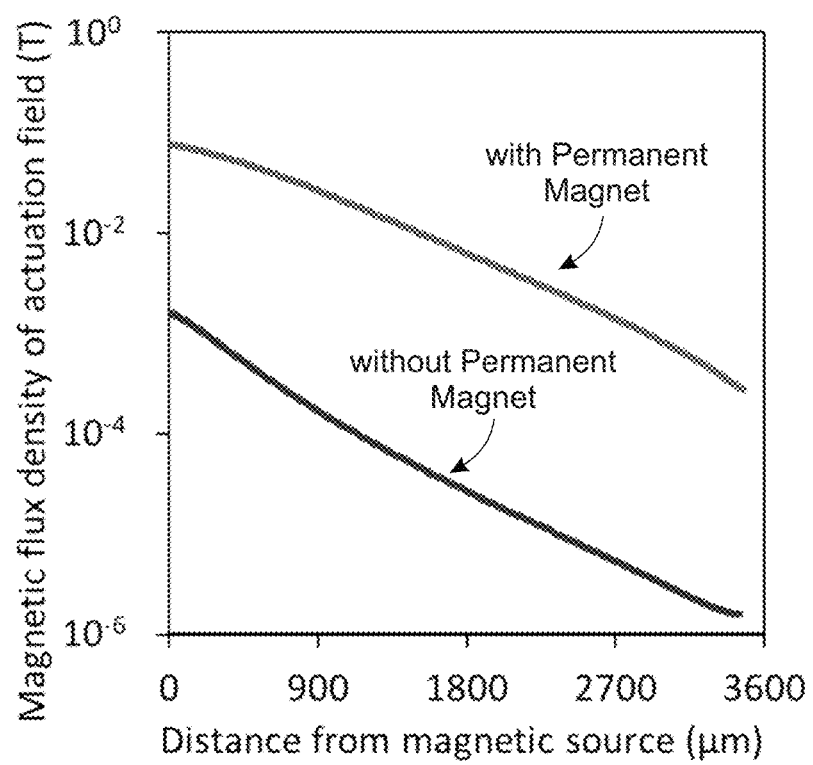
FIG. 3 illustrates simulation results depicting the amplification of the actuation capability with the permanent magnet (top) and without the permanent magnet (bottom) (the x-axis is the vertical distance from the center of the magnetic source).

Compared to conventional magnetic actuation mechanisms in digital microfluidics which use complex translational stages that are not portable or electromagnetic coils that lack the required driving forces to execute efficient fluid operations, the mechanism used by the ferrofluidic fluid handling device 10 avoids the drawbacks of these conventional approaches. By utilizing the matrix of electromagnetic coils 14 as the miniaturized actuator and the millimeter-scale permanent magnet 34 as the actuation magnetic field amplifier, the system can achieve robust fluid operations within a portable footprint. The permanent magnet 34 is incorporated within the system to amplify the actuation magnetic field (generated from the electromagnetic coil(s) 14 with a 0.2A DC current in one embodiment) by approximately two orders of magnitude (FIG. 3). This electronic actuation mechanism allows programmable control over the navigation floor, which in turn controls the movement of the permanent magnet 34 in an autonomous manner. In addition, the magnetic driving force applied by the permanent magnet 34 onto the volume of ferrofluid 100 demonstrates contactless fluid manipulation and non-interfering magnetic-field operations. Due to the aforementioned properties, this novel system can be easily integrated with an assortment of microfluidic chips, enclosed channels, or open surfaces to perform basic tasks such as transportation, as well as a myriad of more complex tasks, including droplet dispensing, generation, filtration, mixing, merging, and biofluid sensing (e.g., using impedimetric, electrochemical or optical sensing modalities that are orthogonal to the magnetic field-based actuation). For example, FIG. 2 (sensing operation) illustrates optical interrogation of an output well 36d within the ferrofluidic fluid handling device 10 using a microscope 110. This may be a benchtop or portable microscope 110 (as shown) or other reader device which operates as the sensing device. Although the system is demonstrated with millimeter scale electromagnetic coils 14 and permanent magnets 34 as actuation components, these components can also be made at the hundred micrometer scale or less preferably at the centimeter scale. Standard wafer scale processes to deposit or electrochemically form magnetic materials with features on the hundred-micron scale are known in the art such as that disclosed in Mallick et al., Magnetic performances and switching behavior of Co-rich CoPtP micro-magnets for applications in magnetic MEMS featured Journal of Applied Physics 125, 023902 (2019); https://doi.org/10.1063/1.5063860, which is incorporated herein by reference.

Traditionally, to achieve specific bio-assays, sequential tasks must be performed in individual microfluidic chips designed for specific functionalities. However, the system and device 10 described herein enables the design of multifunctional ferrofluidic fluid handling devices 10, which can be easily programmed to simultaneously carry out a variety of tasks, or reprogrammed to adapt to new tasks with exceptional flexibility and scalability. For example, in one embodiment, a system or platform is provided in which the second substrate or microfluidic chip 30 is disposable and modular with respect to the first substrate 12 (e.g., PCB) and permanent magnets 34. In this embodiment, the second substrate or microfluidic chip 30 may be removably secured to the first substrate 12 using, for example, one or more fasteners (e.g., clips, retaining tabs, posts, detents, and like), or simply placed above the first substrate 12. This enables the second substrate or microfluidic chip 30 to be properly registered or aligned with the first substrate 12. Different assays can be performed by securing different second substrates or microfluidic chips 30 to the first substrate 12 which is reusable.

Experimental

By utilizing the matrix of electromagnetic coils 14 as the addressable actuator, and the millimeter-scale permanent magnet 34 as the magnetic field actuation amplifier, robust ferrofluidic "ferrobotic" operations can be realized within a compact footprint. As seen in the magnetic field simulation results illustrated in FIG. 3, the incorporated permanent magnet 34 amplifies the actuation magnetic field by approximately two orders of magnitude (generated from passing of a 0.2 A DC current through the electromagnetic coil 14). In this way, high force actuation of relatively dilute magnetic solutions and/or smaller fluid volumes 100 is achieved, rendering robust fluid transportation. Fluid transportation is one of the ferrofluidic fluid handling device's core functionality where an encapsulated "package" 103 within the volume of ferrofluid 100 can be directed by the sequential activation of the coils 14 along a desired route on the first substrate 12.

Basic Functionality: Transportation

The most fundamental functionality of the device 10 is fluid transportation, where the package 103 that is loaded within the volume of ferrofluid 100 is moved in response to the commands that the first substrate or navigation floor 12 receives. The navigation floor 12 is fabricated on a printed circuit board (PCB) (FIGS. 1A, 1B, 2), which comprises an active matrix array of 32×32 electromagnetic (EM) coils 14 for individual actuation, although different array configurations could be used because of the scalability of the system, such as 16×16, 64×64, or 32×64, and switch ICs 16a, 16b along the two sides of the matrix array for row- and column-based addressing of the energized coil 14. Larger array footprints can be beneficial to perform more operations in parallel without interference between individual volumes of ferrofluid 100. The navigation floor 12 is connected to an external power source 19 and microcontroller 18 (MCU) for command transmission. FIG. 1A illustrates a schematic of the navigation platform 12 for ferrobot manipulation. As used herein, a single ferrobot refers to a single permanent magnet 34. Ferrobots 34 refers a plurality of permanent magnets 34. As explained herein, the permanent magnet(s) 34 or ferrobot(s) 34 are used to transport and/or manipulate cargo in the form of volume(s) of ferrofluid or droplets 100 that are attracted to the permanent magnet(s) 34. The volume(s) of ferrofluid or droplets 100 may themselves contain one or more packages 103 therein. The ferrofluidic fluid handling device 10 may include a single such ferrobot 34 or a plurality of ferrobots 34.

After receiving the manipulation command, the MCU 18 calculates the coordinates of the EM coils 14 to be actuated, then sends x- and y-components of the target coils 14 to the low-side and high-side switches 16a, 16b respectively, which activates the selected row and column lines. In some embodiments, the EM coils 14 are also equipped with sensors to detect the location of the ferrobots 34 from changes in the local impedance within the occupied coils 14. The location of the ferrobots 34 is then integrated into the calculations by software 22 and MCU 18 to optimize the actuation coordinates. The target EM coils 14 are selectively actuated by passing DC current when the corresponding row and column lines are activated, which establishes localized EM fields to attract the permanent magnets 34 and associated volumes of ferrofluid or droplets 100 to the target positions. Power management controls the total current input which is equal to $nI_c$ (n is the number of coils actuated, $I_c$ is the current passed for each coil, usually set to 0.2A). The navigation floor 12 of the device 10 allows for scalable and addressable two-dimensional manipulation of single or multiple "ferrobots" 34 via electromagnetic actuation from the EM coils 14.

Figure 4C:
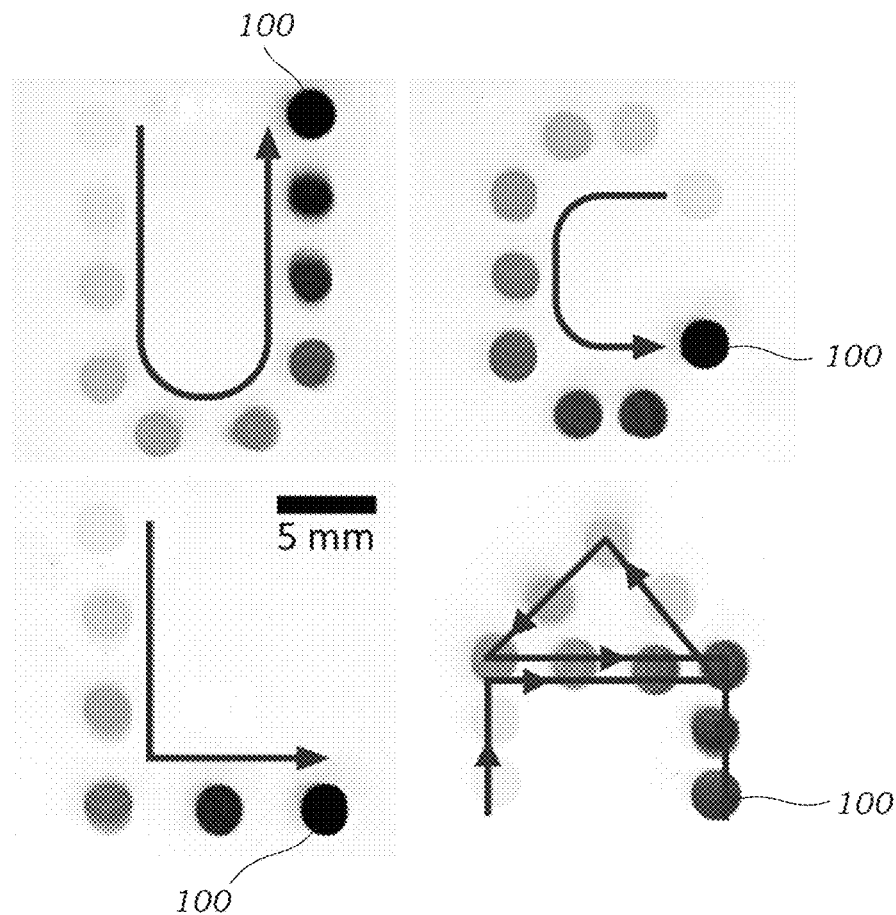
FIG. 4C illustrates overlaid sequential images (derived from video frames) that visualize the commuted path of the volume of ferrofluid/droplet (programmed with different navigation plans; the duration for commuting "U", "C", "L" and "A" paths were correspondingly 1.4 s, 1.4 s, 0.7 s, and 2.3 s).

By pre-programming sequences into the MCU 18 (using a computer program or script on software 22) or sending commands from the user interface, the ferrobot 34 can be transported dynamically in any direction on the x-y plane of either the closed or open surface fluidic space in response to pre-programmed pathways or real-time user controls. The dexterity of this approach is shown in the layered image in FIG. 4C, where a 5 microliter ferrofluid droplet 100 is attracted and moved along user-defined pathways to write "UCLA" within 2 seconds for each character. This platform also enables the simultaneous and sequential manipulation of multiple ferrobots 34 carrying ferrofluid droplets 100.

Figure 4D:
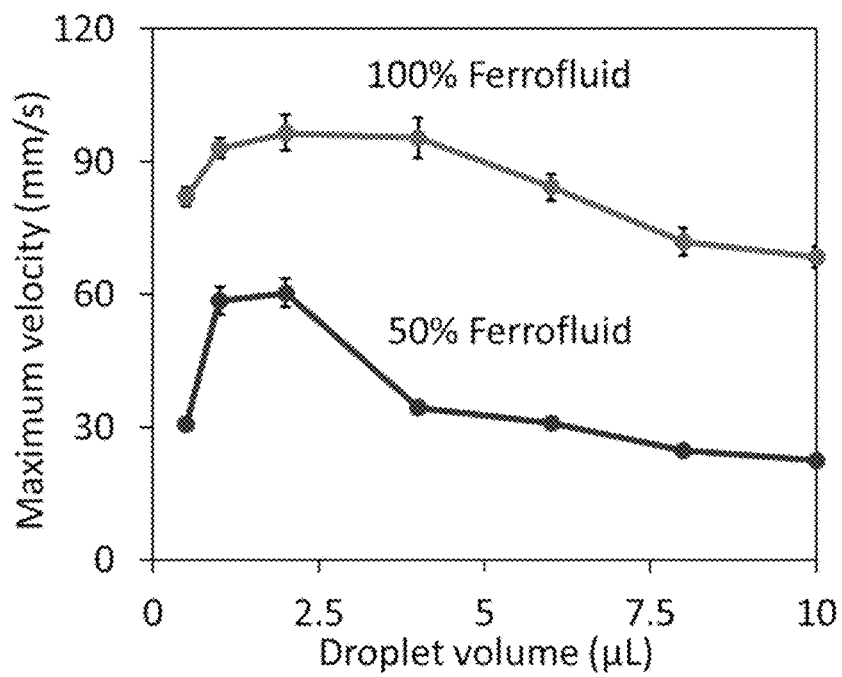
FIG. 4D illustrates a graph characterizing the maximum transportation velocity for two different ferrofluid concentrations. Error bars indicate standard error (n=3).

The relationship between the droplet 100 volume, concentration of ferrofluid carrier, and maximum velocity of a single ferrobot 34 are shown in FIG. 4D. The platform is capable of achieving transportation velocities one the order of 100 mm/s with a 2-microliter undiluted ferrofluid carrier (ferumoxytol) comprising droplet 100. Three forces are considered to play dominant roles in the ferrofluid carrier motion in the horizontal plane: the magnetic body force $$F_M = \frac{V_M \chi}{\mu_0}(B \cdot \nabla)B$$

(where $V_M$ is the magnetically actuated volume of ferrofluid carrier, $\chi$ is magnetic susceptibility which is proportional to ferrofluid concentration, $\mu_0$ is permittivity of free space, and B is the magnetic field), friction between the ferrofluid carrier and substrate of the channel $F_f = K_f R_b \mu_{oil} U$ ($K_f$ is friction constant, $R_b$ is the radius of the bottom contact area, $\mu_{oil}$ is the viscosity of the oil, and U is the velocity of the carrier), and drag force from the oil environment $$F_{drag} = 3\pi D \mu_{oil} U \frac{1 - 2\mu_{oil}/3\mu_{ff}}{1 + \mu_{oil}/\mu_{ff}}$$

(D is the diameter of the carrier, $\mu_{ff}$ is viscosity of the ferrofluid). At a steady-state maximum velocity, the three forces follow the equation: $F_M = F_f + F_{drag}$. Thus, the maximum velocity can be calculated as follows:

$$U_{max} = \frac{\frac{V\chi}{\mu_0}(B \cdot \nabla)B}{K_f R_b \mu_{oil} + 3\pi D \mu_{oil} \frac{1 - 2\mu_{oil}/3\mu_{ff}}{1 + \mu_{oil}/\mu_{ff}}}, \quad (1)$$

As equation 1 shows, $U_{max}$ is proportional to the ferrofluid concentration and the ferrofluid carrier volume which is magnetically actuated. When the ferrofluid carrier volume, V, is smaller than the space of the activated EM-field, $V \approx V_M$, this results in an increase of the maximum velocity when the ferrofluid volume increases. However, $V_M$ will reach a saturation value when Vis considerably larger than the space of the localized EM-field. In this scenario, two dissipative forces opposing the droplet movement, $F_f$ and $F_{drag}$, tend to lower the maximum velocity when the carrier volume increases, resulting in larger $R_b$ and D.

Figure 9B:
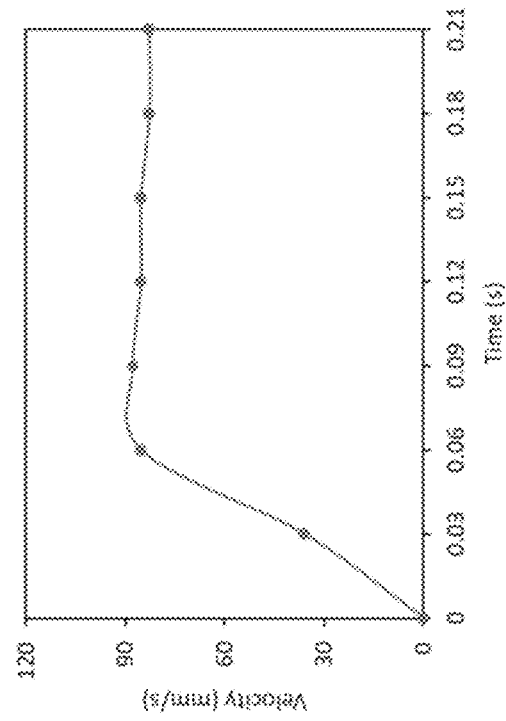
FIG. 9B illustrates the corresponding measured averaged velocity of the droplet of FIG. 9A.
Figure 9A:
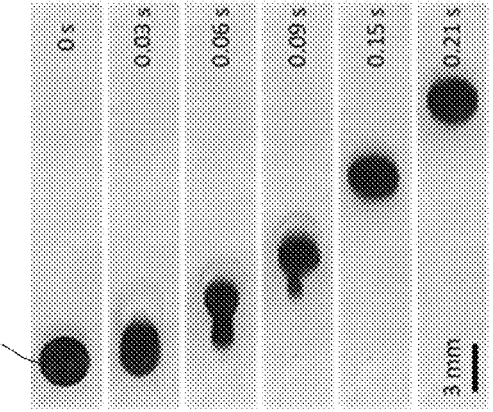
FIG. 9A illustrates sequential images taken of a representative droplet moving along the PCB navigation floor.

As shown in FIG. 4D and FIG. 9B, with the devised approach, maximum droplet 100 transportation velocities on the order of 10 cm/s can be achieved. The maximum velocity of the volume of ferrofluid or droplet 100 initially increases along with its size, showing the dominance of the driving magnetic force on relatively small droplets 100. The following decrease in maximum velocity illustrates the increased dominance of frictional forces beyond a certain droplet size. The same trend is observed for a more diluted ferrofluid concentration (50% dilution by volume, also shown in FIG. 4D). Here, the droplet volume characterization range is chosen based on the anticipated microfluidic droplet applications (e.g., the MMP assay or the like).

Figure 4E:
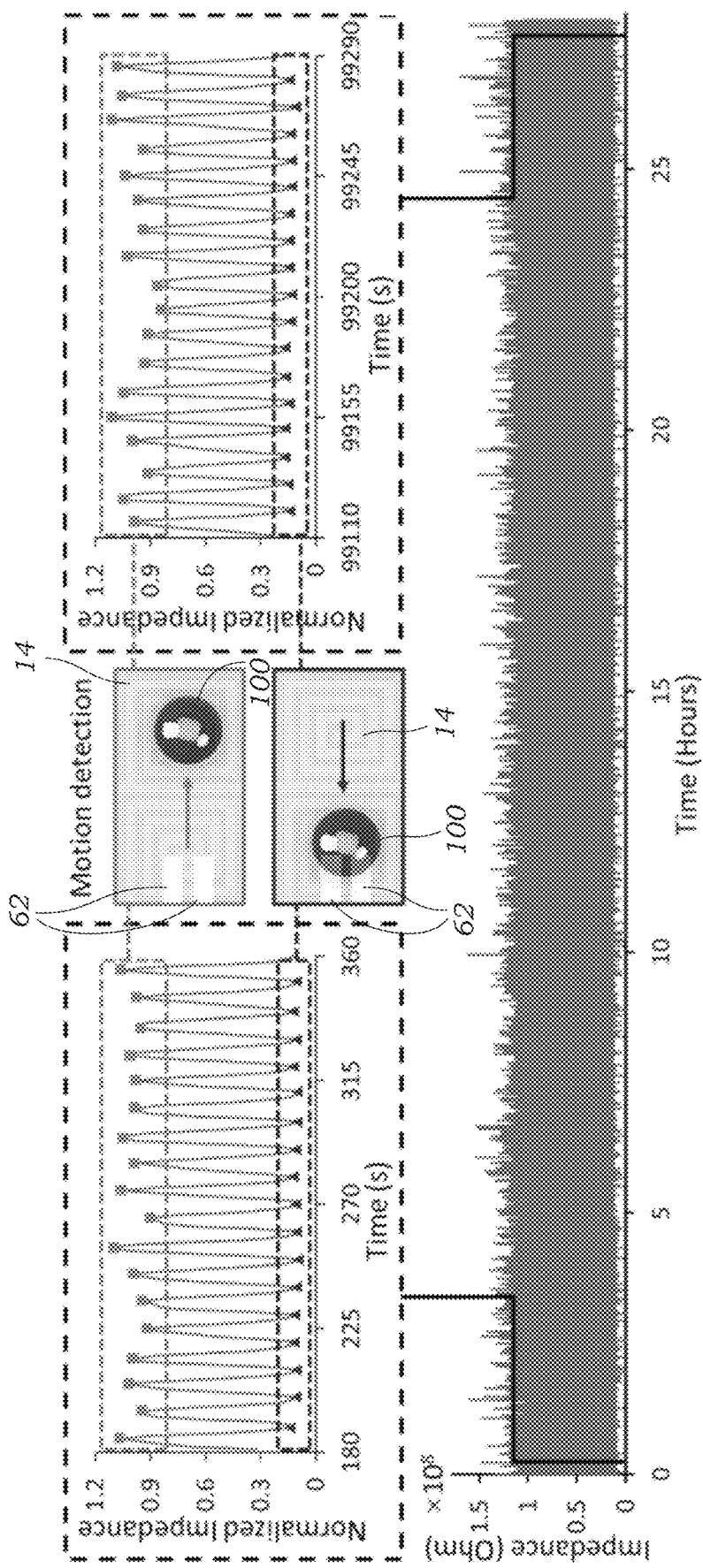
FIG. 4E illustrate the characterization of the oscillatory transportation of a package contained within a volume of ferrofluid (sensed with an impedance sensing electrode pair) to evaluate the robustness of actuation (performed for >24 hours).
Figure 4F:
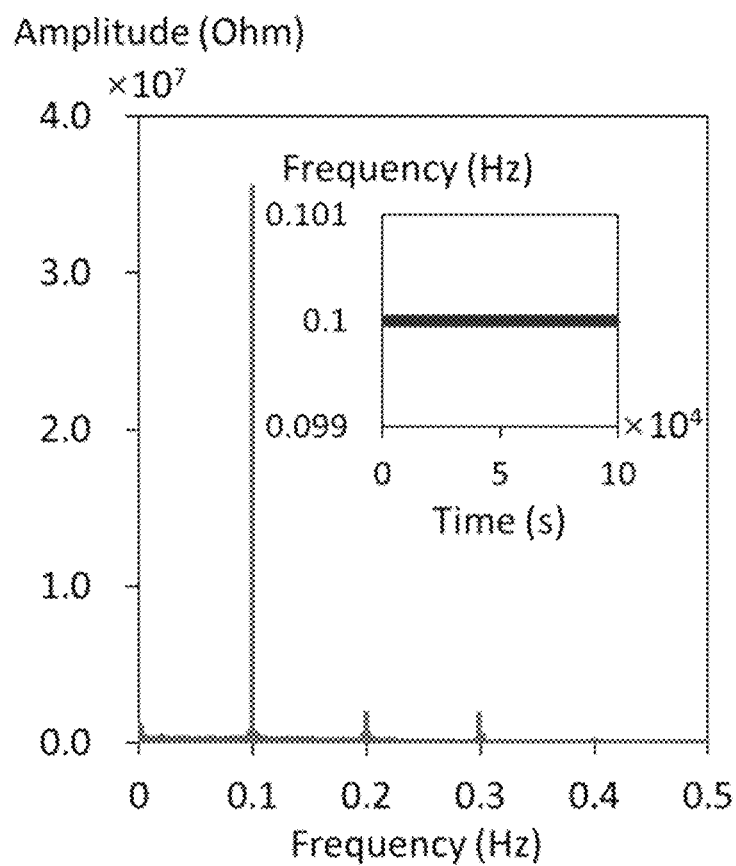
FIG. 4F illustrates the results of Fast Fourier Transform (FFT) analysis of the oscillatory profile measured by the impedance sensing electrodes in FIG. 4E. Inset shows variation of the fundamental frequency of the 2000 s-segmented time windows, depicting near zero variation.

The contactless aspect of the actuation mechanism inherently renders it repeatable and durable, in contrast with contact-based EWOD actuation that is susceptible to surface degradation. To demonstrate the durability of the device 10, an illustrative continuous characterization experiment was performed, which involved a 10,000-cycle automated oscillatory transport (frequency: 0.1 Hz) of a package 103 containing with volume of ferrofluid 100 over the duration of >24 hours (FIG. 4E). Specifically, the volume of ferrofluid 100 was programmed to automatically move in and out of contact with an impedance sensing electrode pair 62 (FIG. 4E), patterned on the substrate of a microfluidic chip 30. The electrodes 62 were used to continuously track the entrance/departure of the package 103 through monitoring the impedance signal change (correspondingly leading to an increased/decreased measured impedance, annotated in FIG. 4E). Fast Fourier Transform (FFT) analysis of the continuously recorded data (FIG. 4F) yielded an output fundamental frequency of 0.100 Hz, which matches the input actuation frequency at the MCU level. Furthermore, the detailed FFT analysis of the 2000 s-segmented time windows yielded less than 0.01% variation in the motion frequency of the package 103. Oscillatory droplet transport experiments were also performed at 1 Hz with water- and plasma-based droplets 100 (over 1000 cycles). The FFT analysis indicates that repeatable oscillatory motions are achieved for both droplet samples. It is worth noting that beyond ~10 Hz, the droplet 100 cannot be effectively manipulated because this leads to a velocity that exceeds the maximum velocity threshold.

Advanced Functionalities: Dispensing, Droplet Generation, Merging, and Filtration To attain a versatile panel of functionalities, various disposable fluidic chips can be seamlessly integrated with the ferrofluidic fluid handling device 10. The contactless fluid manipulation and non-interfering magnetic-field operations of the ferrobotic mechanism allow the volumes of ferrofluid 100 with bio-package(s) 103 contained therein to interface easily with fluidic structures such as corrugated walls 36g, small vias 42, patterned actuation and sensing electrodes 62 and filter media 44. This compatibility with diverse peripheral components enables advanced functionalities such as droplet dispensing, generation, merging, mixing, and filtration.

Figure 5A:
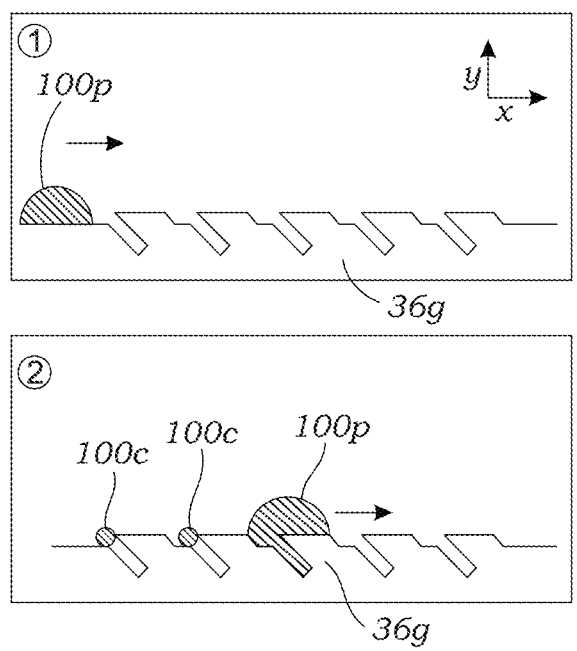
FIG. 5A schematically illustrates one droplet dispensing mechanism, involving the transportation of the droplet (containing the package) against a corrugated microfluidic wall.
Figure 5B:
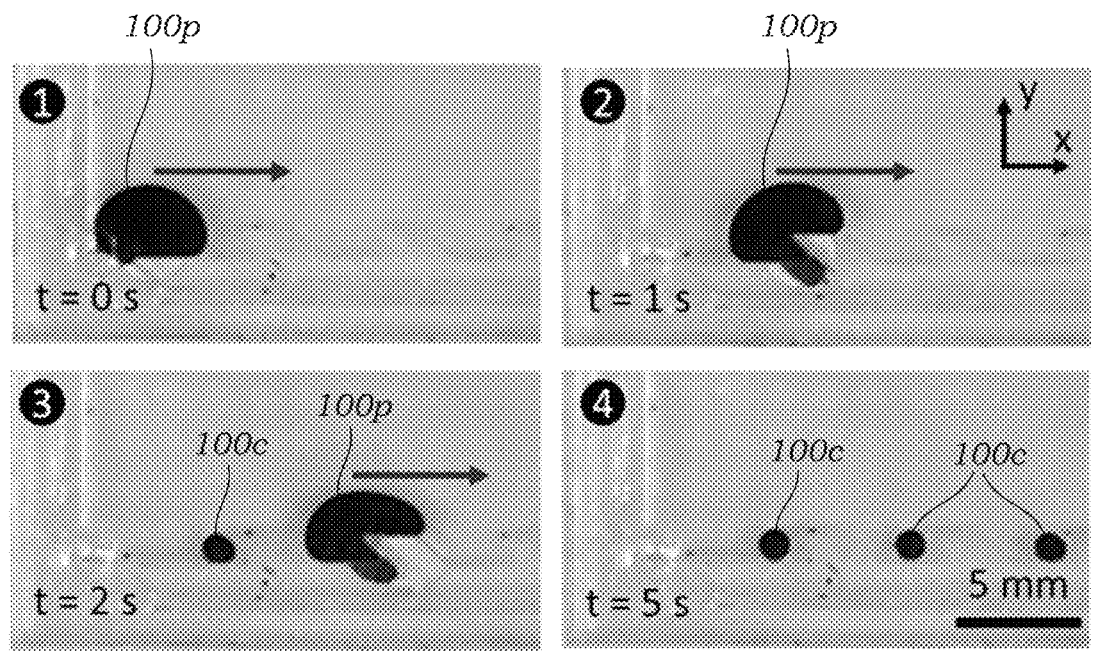
FIG. 5B illustrates sequential optical images of the droplet dispensing process of FIG. 5A.
Figure 5C:
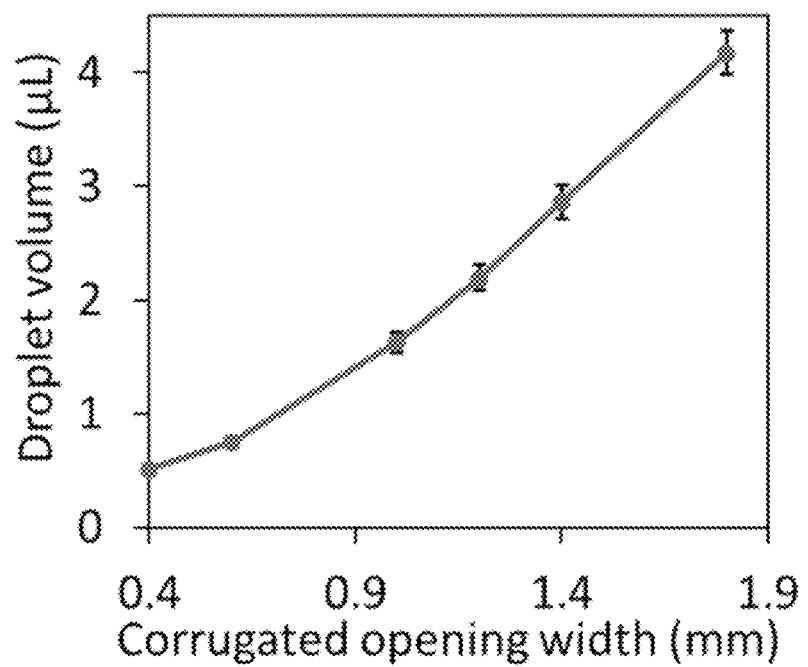
FIG. 5C illustrates a graph of the dispensed droplets' size for different corrugated opening widths. Error bars indicate standard error (n=10).

Droplet 100 dispensing is a precise liquid-handling capability that is useful for applications such as drug discovery or quantitative biological and chemical analysis. To incorporate droplet 100 dispensing into the ferrofluidic fluid handling device 10, a microfluidic chip 30 with a corrugated wall structure 36g was utilized to create a reservoir for the ferro-carrier and bio-package 103 mixture. As illustrated in FIG. 5A, a "parent" mixture-droplet 100p is guided by the permanent magnet 34 underneath the microfluidic chip 30 which acts as a motor. When it is transported along the corrugated structure 36g, smaller "child" droplets 100c are dispensed. As shown in FIG. 5B, the parent droplet 100p starts moving along the corrugated wall 36g at t=0 s. After the droplet 100p passes the corrugated structure at t=1 s, due to geometric pinching, a small volume of the droplet breaks away from the parent and enters the structure which becomes the child droplet 100c. The corrugated structure 36g can be designed in a repeated pattern to dispense multiple droplets 100c, as shown in the final step of FIG. 5B. Three homogenous droplets 100c (1.63±0.09 uL) are dispensed at t=5 s. Larger numbers of droplets 100c can also be dispensed because of the scalability, like 5, 12 or 20 droplets at once. In a related embodiment, the corrugated structure/geometric pinching occurs in a height dimension of the substrate (z-plane) instead of in the x-y plane of the substrate to dispense droplets 100c. To study the level of control that the device 10 has on the dispensed droplet 100c sizes (for different ratios of the ferro-carrier and bio-package 103), various corrugated-opening widths were tested. The results show that by increasing the corrugated-opening width and the ferro-carrier mixture ratio, the dispensed droplet volume can be increased in a controlled manner from 0.5 and 4 μL (FIG. 5C).

Figure 5D:
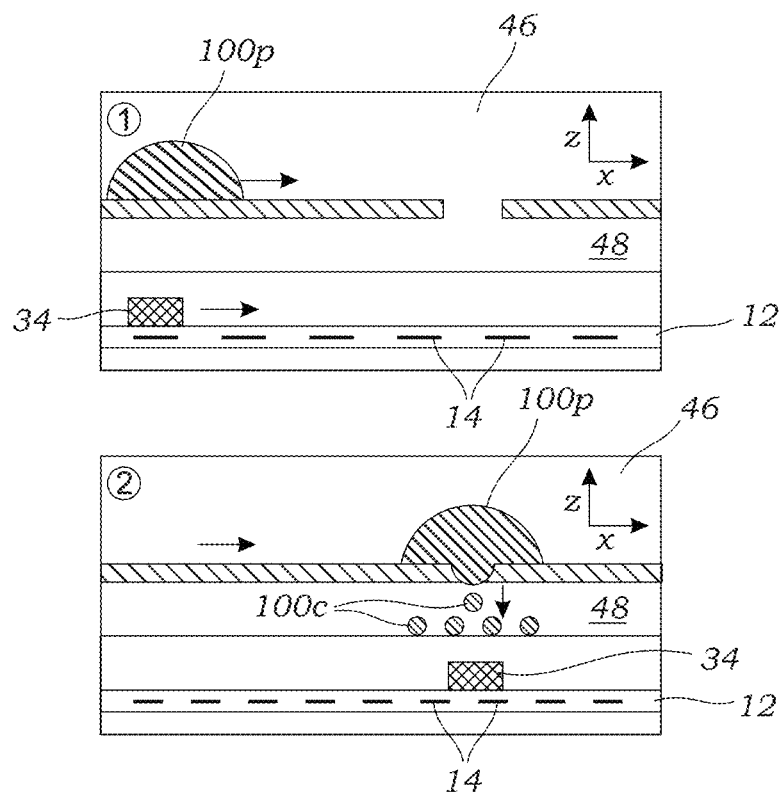
FIG. 5D schematically illustrates the droplet generation process, involving the droplet transportation to a VIA-like orifice.
Figure 5E:
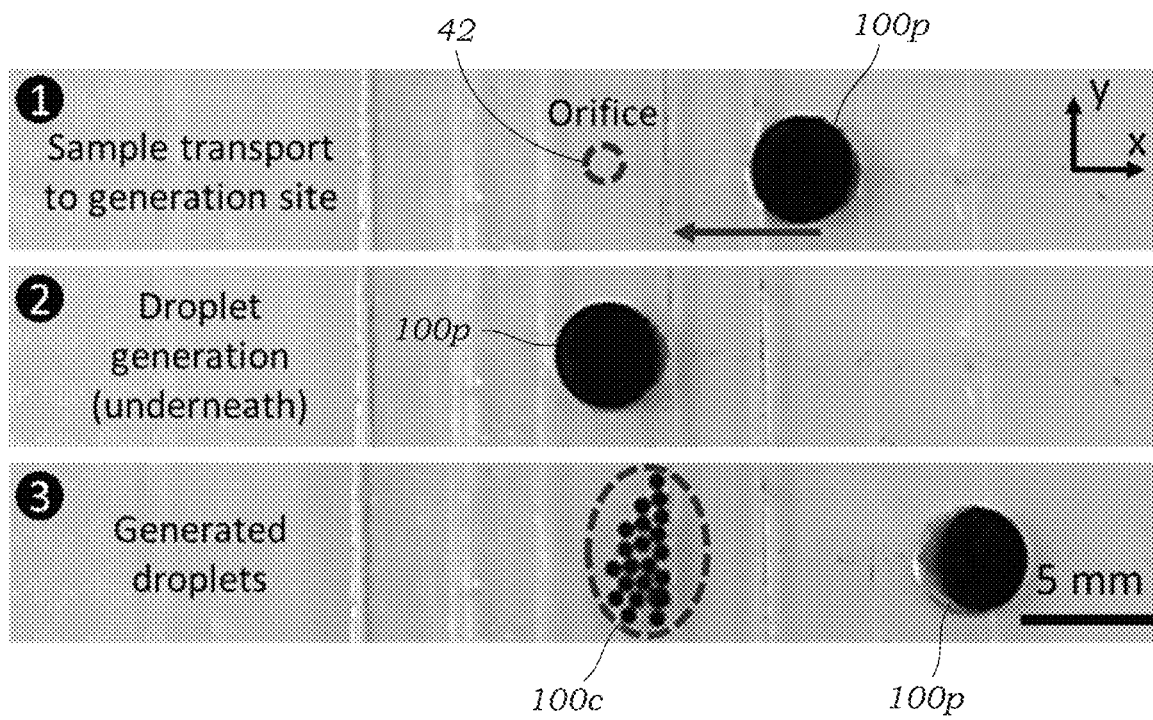
FIG. 5E illustrates sequential optical images of the droplet generation process.
Figure 5F:
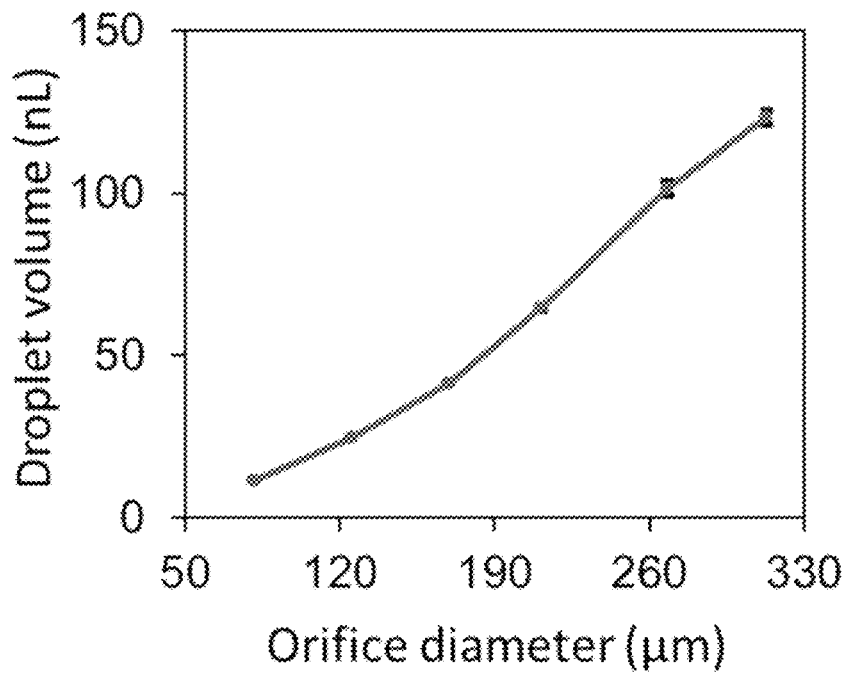
FIG. 5F illustrates a graph of the generated droplets' volume for different orifice diameters. Error bars indicate standard error (n=20).
Figure 5G:
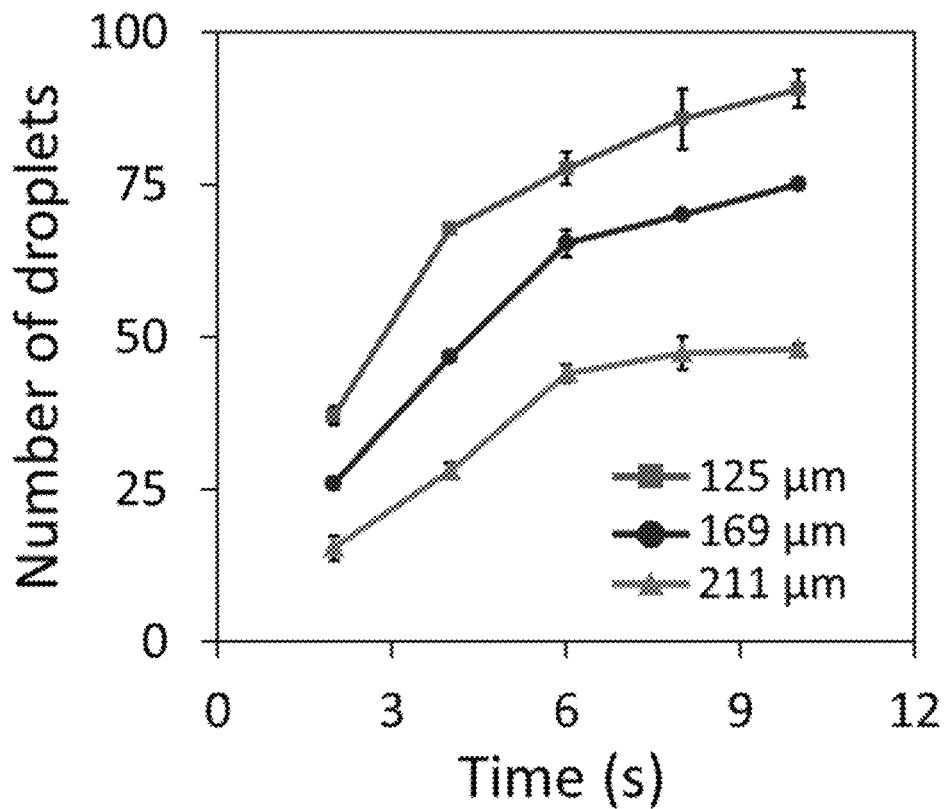
FIG. 5G illustrates a graph of the number of droplets generated as function of time for different sized orifices.
Figure 10A:
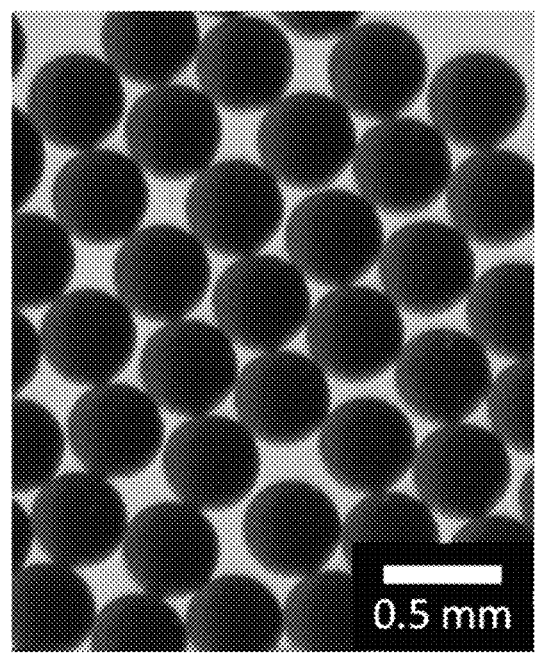
FIG. 10A is an optical microscopic image of generated droplets using a 169 μm-diameter orifice.
Figure 10B:
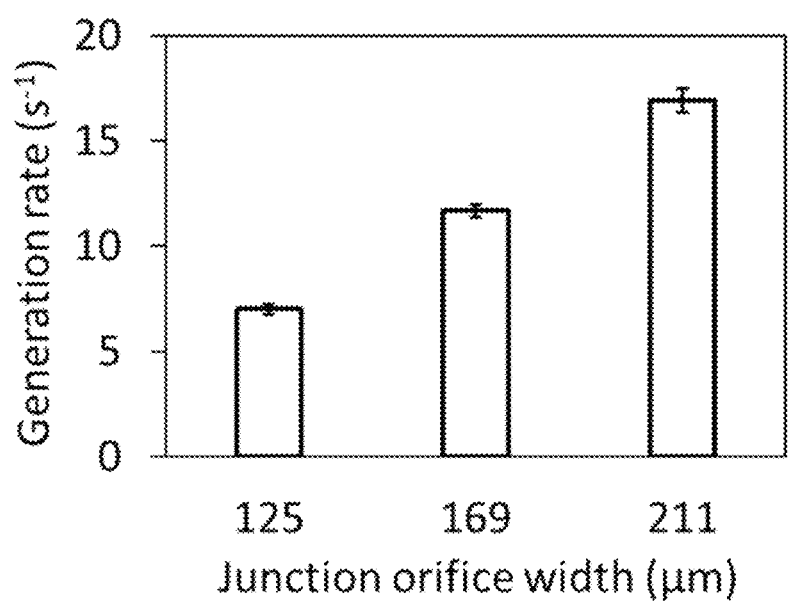
FIG. 10B is a graph that characterizes the droplet generation rate for varying orifice diameters (based on counting the generated droplets over 4 s).

In order to achieve smaller droplet volumes and higher throughput, another droplet generation functionality was developed by drawing the child droplets 100c vertically through one or more orifices or vias 42 (FIGS. 2, 5D). In related embodiments the orifices or vias 42 can be included in a horizontal wall or surface within the fluidic device 10. As demonstrated in FIG. 5D, a multi-layer microfluidic channel 46, 48 with an intermediary vertical orifice 42 is placed on top of the electromagnetic navigation floor 12 and permanent magnet 34. When the parent droplet 100p is guided to the top of the orifice or via 42, it is attracted towards the permanent magnet 34 by a vertically-exerted magnetic force. Once a volume of the droplet passes the orifice 42, smaller droplets 100c are generated by breaking up the parent droplet 100p. As shown from the top view in FIG. 5E, the parent droplet 100p moves to the orifice 42 in the first step. In the second step, the parent droplet 100p is positioned on top of the orifice 42 for 7 s, continuously generating smaller child droplets 100c. In the third step, the parent droplet 100p is moved away from the orifice 42 and the generated child droplets 100c are stored in the first layer 48. The resulting child droplets 100c have volumes on the nanoliter scale (~10 nL to 125 nL) and are controlled by changing the width of the junction orifice (FIG. 5F). By adjusting the width of the junction orifice 42, the droplet 100 volume (~10-125 nL) and the generation rate can be tuned (FIGS. 10A, 10B). The generation rate is characterized in the FIG. 5G. Of course, by adjusting the size of the orifice 42 different sized child or split droplets 100c may be formed (from nanoliter to microliter-sized).

Figure 5H:
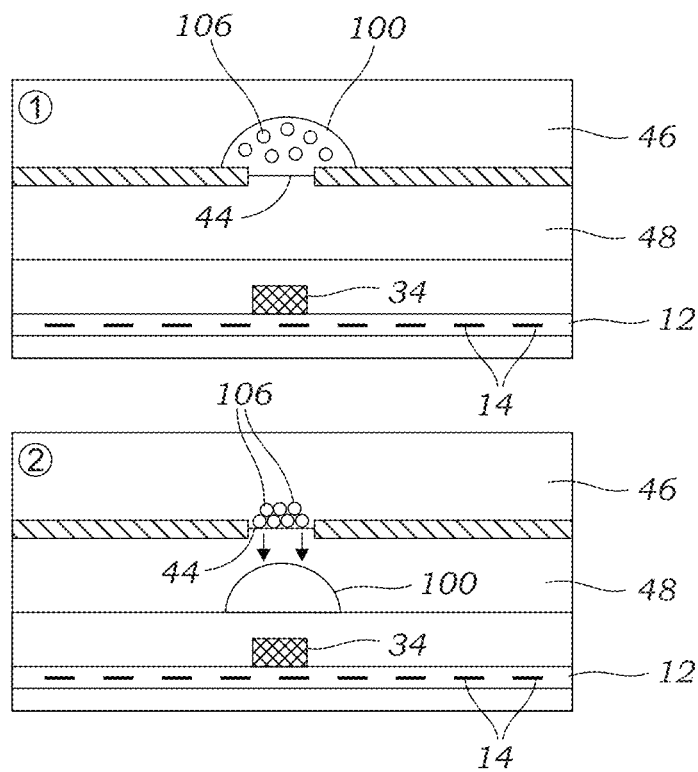
FIG. 5H schematically illustrates the filtration mechanism.
Figure 5I:
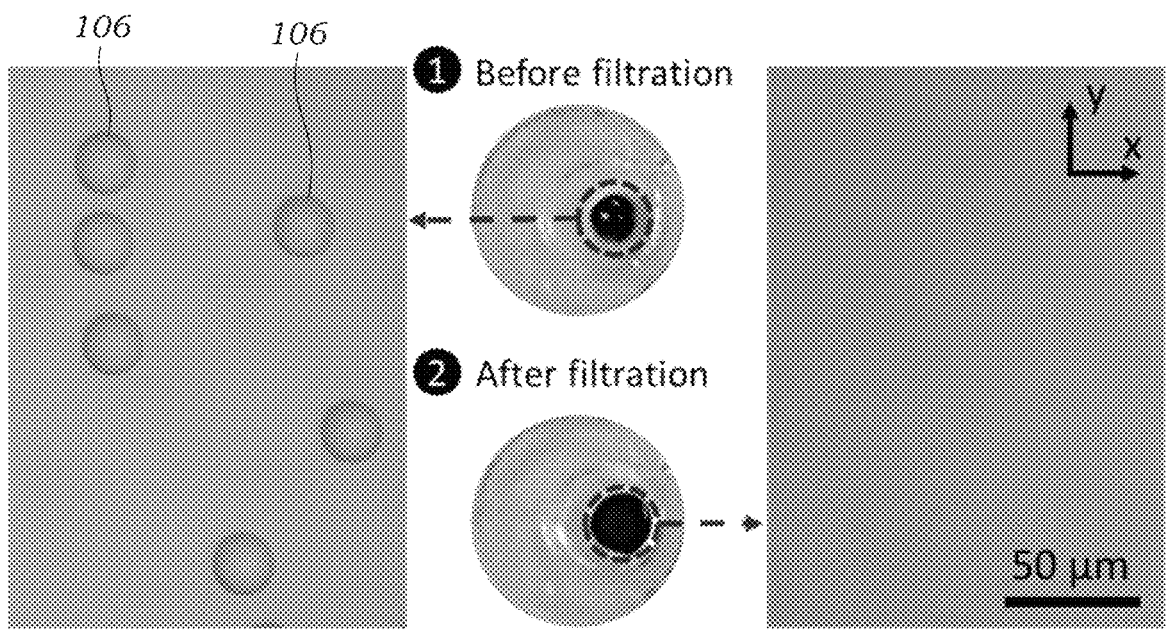
FIG. 5I illustrates an optical image of the solution sample before and after filtration.
Figure 5J:
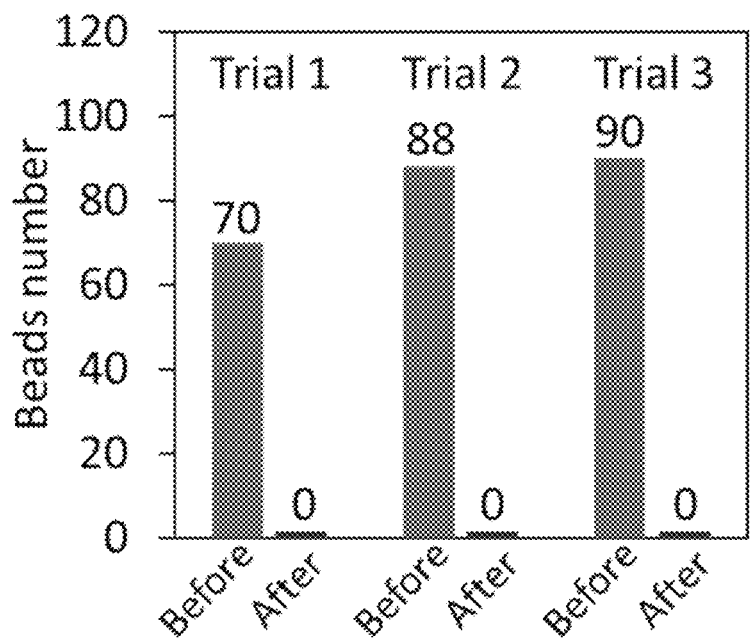
FIG. 5J are histograms showing bead counts before and after filtration (three trials).
Figure 5K:
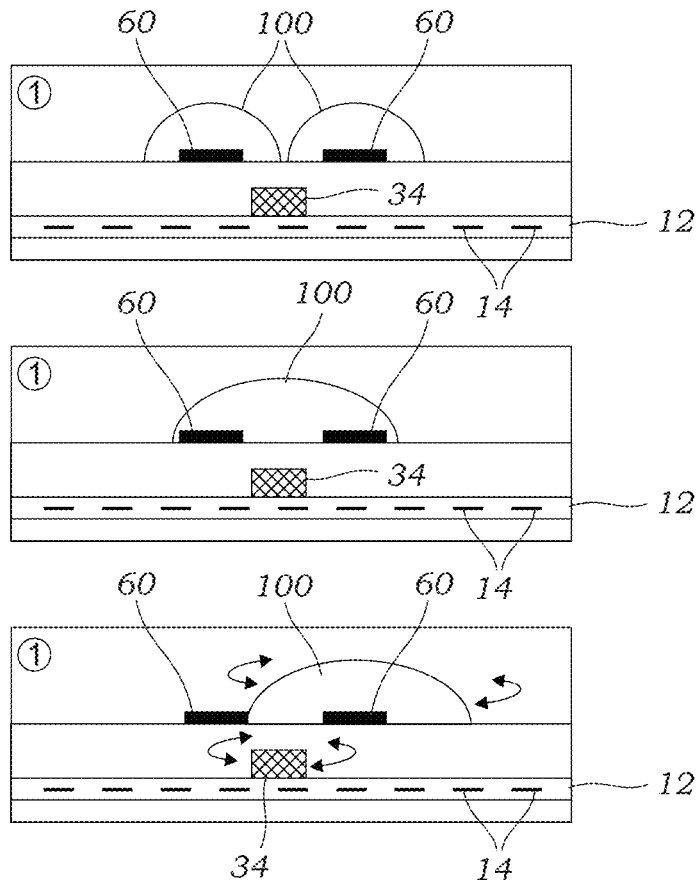
FIG. 5K schematically illustrates droplet merging and mixing mechanisms.
Figure 5L:
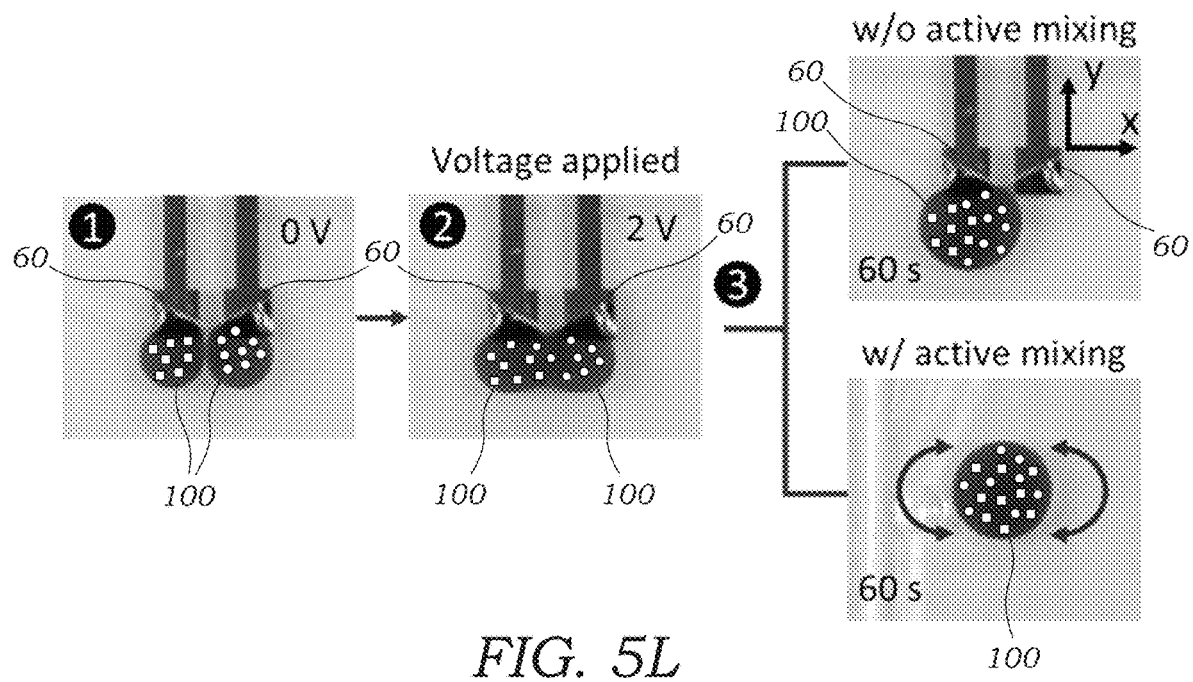
FIG. 5L illustrates optical images to visualize the droplet merging (upon applying 2 V) and mixing process (with and without active mixing).

Droplet merging enables droplet dilution and the exchange of multiple droplets' contents or timed addition of reagents, which plays a vital role in biological assays such as protein crystallization, cytotoxicity assays, DNA/RNA measurements, protein measurements, measurement of glucose or other small molecules, and dose-response analysis of drug compounds. Here, to achieve the merging of droplets 100 in the ferrofluidic fluid handling device 10, an electrode 60 (FIGS. 2, 5K, 5L), is positioned on the substrate floor of the second substrate/microfluidic device 30 for electrocoalescence. Due to the non-interfering magnetic-field and contactless properties of the actuation mechanism, the droplets 100 can be transported on top of the electrocoalescence electrodes 60 without affecting the properties of the electrode. When a voltage is applied to the electrodes 60, the droplets 100 above are merged. To achieve homogeneous and evenly-distributed droplet contents after merging, the merged droplets can then be mixed by actuating four neighboring magnetic coils in a cyclic fashion. This cyclic motion in a circular, rectangular, or other direction changing path creates folding flows in alternating directions optimal for mixing. As shown in FIG. 5L, the two droplets 100 are transported to the top of the electrocoalescence (i.e., merging) electrodes 60 at t=0 s. When a 2 V voltage is applied, the two droplets 100 suddenly merge and their colors (red (represented by circles) and green (represented by squares), respectively) gradually diffuse into each other. By comparing the color distribution of the merged droplets 100 with and without cyclic motion for 60 s, it was observed that the homogeneity of the spun droplet's contents increased significantly at a shorter time point (FIG. 5L). Other methods of merging based on drawing droplets 100 together through geometric constrictions, bringing droplets 100 or regions of low surfactant concentration in the oil, or increasing local temperature to enhance coalescence can also be performed.

Microfluidic filtration is one of the sample processing procedures required for applications such as cell separation and tissue dissociation. As shown in FIGS. 5H and 5I, a multi-layer microfluidic chip 30 was produced with a filter membrane 44 with a 10 μm size cut-off as an upper layer, although filter membranes or other filter media 44 with various pore sizes can also be used. Because the magnetic body force applied to a volume of ferrofluid or droplet 100 is contactless, the droplet 100 is pulled through the filter 44 entering the lower layer 48 and leaving larger 25 μm particles 106 above the size cut-off on the upper layer 46 (FIGS. 2 and 5H). Before applying the magnetic force, 25 μm beads can be observed in the droplet with a concentration of 76 beads/μL. After the magnetic force is applied, beads are filtered in the top layer 46 and the bead concentration in the filtered droplets 100 is reduced to 0.

Multi-Ferrobot Teamwork for Efficient Ferrofluid Volume Sorting

Figure 6A:
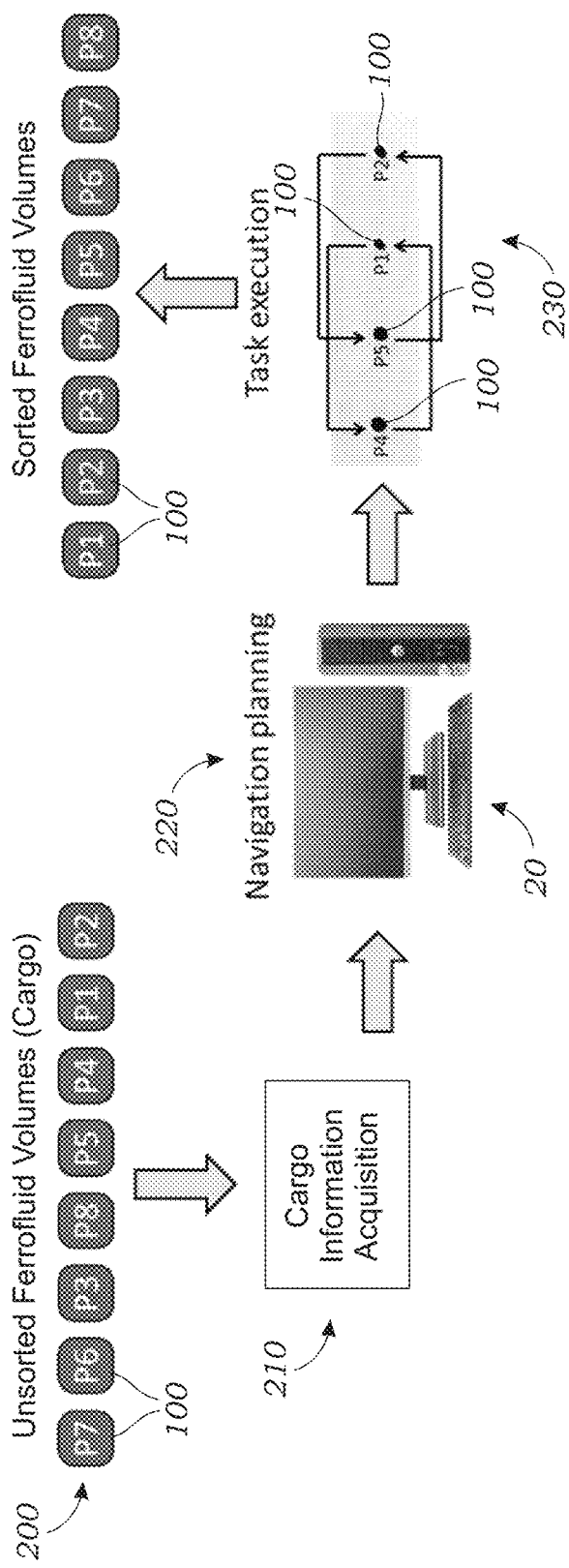
FIG. 6A schematically illustrates a system-level view of a sorting procedure.

The scalability of the electromagnetic navigation floor 12 allows fleets of ferrobots to simultaneously and efficiently accomplish collaborative tasks. Taking advantages of the collaboration between multiple ferrobots, a variety of tasks can be assigned to the device 10 or system incorporating the device 10. Here, as an example, in FIG. 6A, a ferrofluid-sorting task is assigned to the ferrofluidic fluid handling device 10. The system's goal is to sort randomly-sequenced, or unsorted, ferrofluid volumes into a sorted sequence based on increasing drop volume. This sorting task is executed through the following sequence of procedures: (1) eight ferrofluid volumes 100 of various sizes are loaded into the device 10 as seen in operation 200 in FIG. 6A with random relative positions although more or less ferrofluid volumes 100 can also be sorted by the same method, like 4, 16, 24 or 32; (2) a top-view image of the device 10 is captured in operation 210 so as to identify the ferrofluid volume 100 sizes and positions; (3) the size and position information are used to computationally calculate the navigation pathways for the ferrobots 34 using software 22 executed by a computing device 200 in operation 220; and (4) a command containing the pathway information is sent to the microcontroller 18 in operation 230 that guides the ferrobotic system. After receiving the individual commands, the particular coils 14 are actuated and each ferrobot 34 will initiate their separate assignments in order to achieve the overarching sorting task as seen in operation 240 where the volumes of ferrofluid 100 are sorted.

Figure 6B:
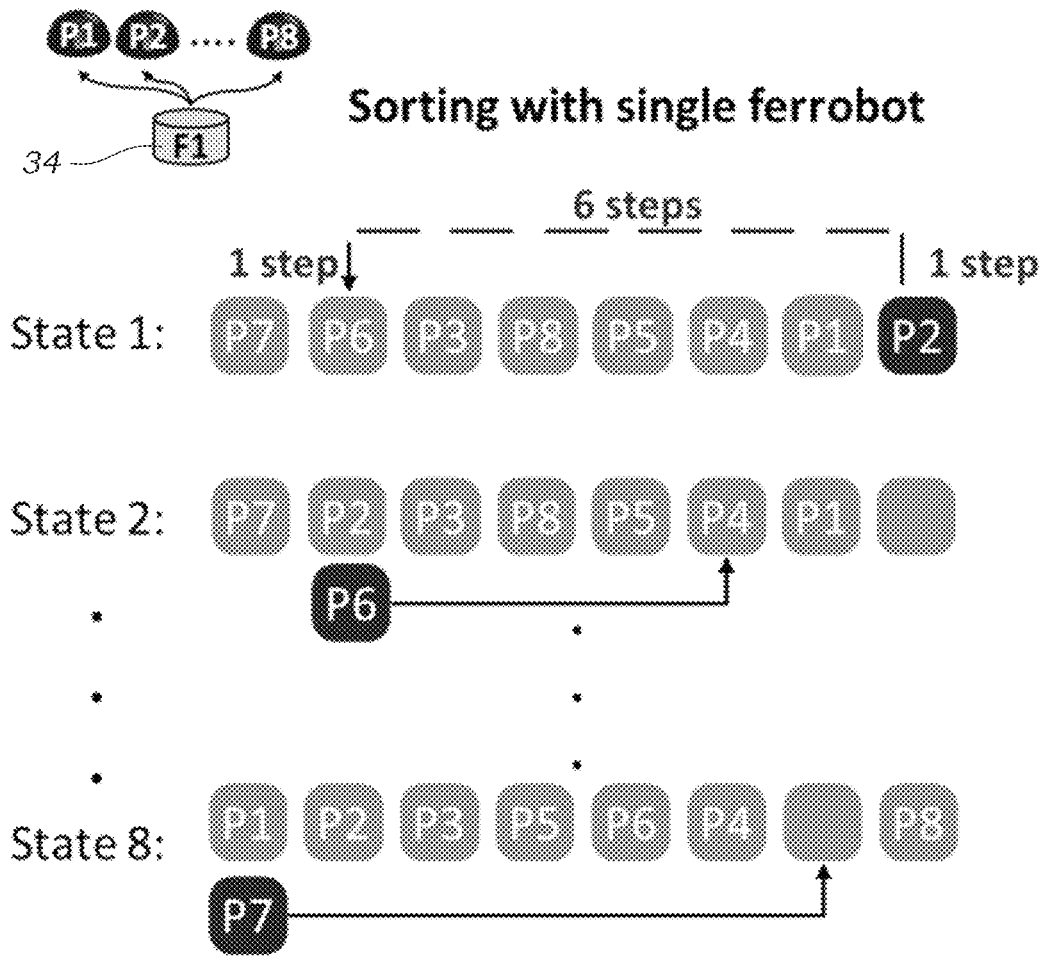
FIGS. 6B and 6C illustrate a comparison of the sorting efficiency achieved by a single volume of ferrofluid (FIG. 6B) and eight (8) ferrobots tasked with sorting a random sequence of eight ferrofluid volumes. State-by-state transitions for both scenarios are illustrated and the table details the commuted distance of each ferrobot. The snapshots from the sorting experiment performed with eight (8) ferrobots are shown on the right of FIG. 6C (captured at the end of each state).

To demonstrate the advantages of utilizing multiple ferrobots 34 for collaborative tasks, a comparison between single-ferrobot 34 and multi-ferrobot 34 operation is detailed in FIG. 6B. When only one ferrobot 34 is used for sorting, it is responsible for transporting all the volumes of ferrofluid 100 by itself. At each state (the period in which the available ferrobots 34 start and finish moving), only one volume of ferrofluid 100 can be moved to its target location. In order to quantitatively characterize the sorting efficiency, a "unit step" is defined to measure the distance that the ferrobots 34 will move. For example, at state 1, the ferrobot 34 moves 8-unit steps (2 vertical steps and 6 horizontal steps) to transport ferrofluid volume 2 from position 8 to position 2. Since only one ferrobot 34 is performing the task, the "temporal steps" (number of steps which determine the maximum time elapsed over the course of a state) required to complete sorting are equal to the unit steps moved by the ferrobot 34. In the example shown, forty (40) total temporal steps were observed, summed across the number of steps taken at each state.

Figure 6C:
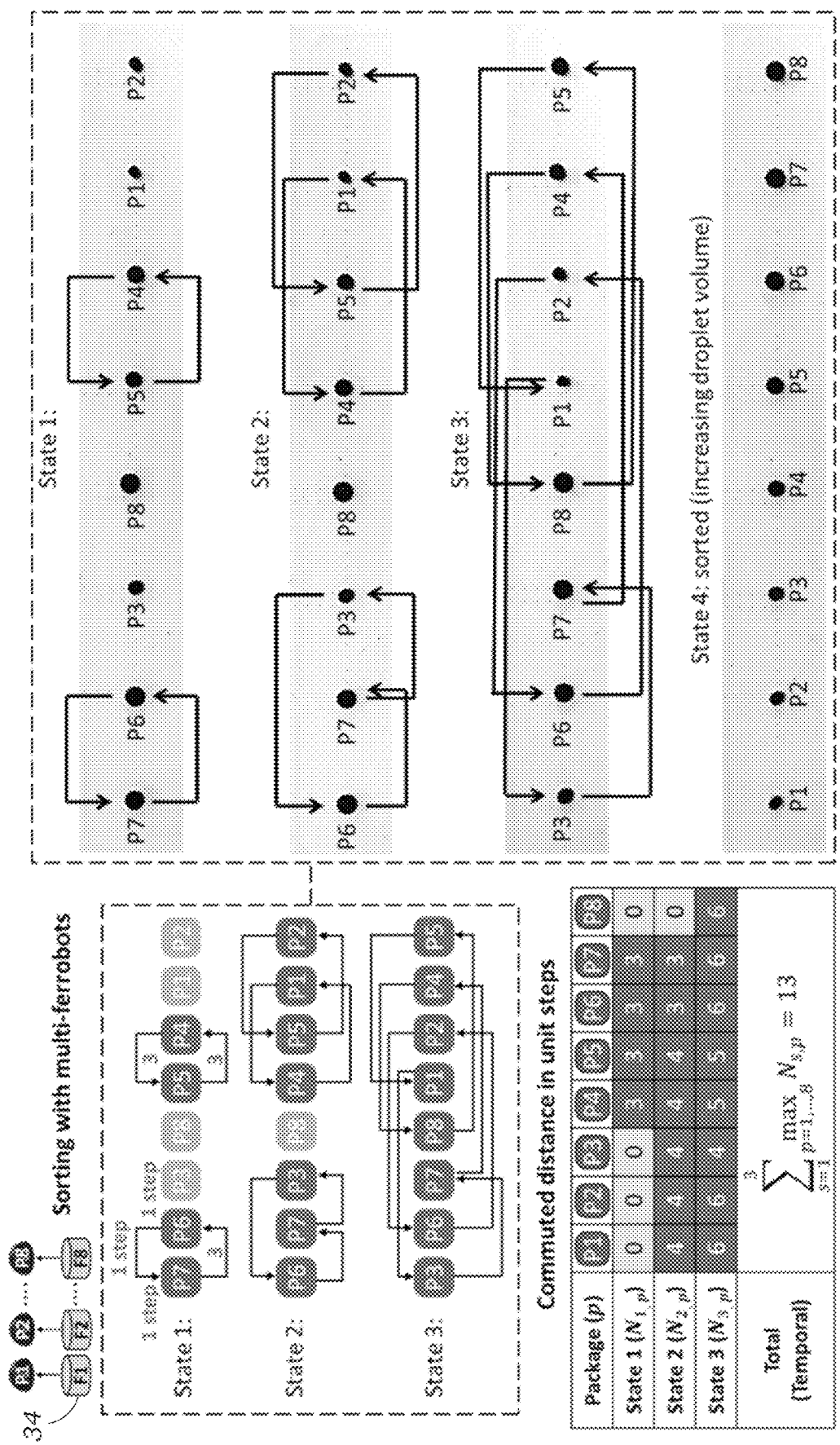
Figure 6D:
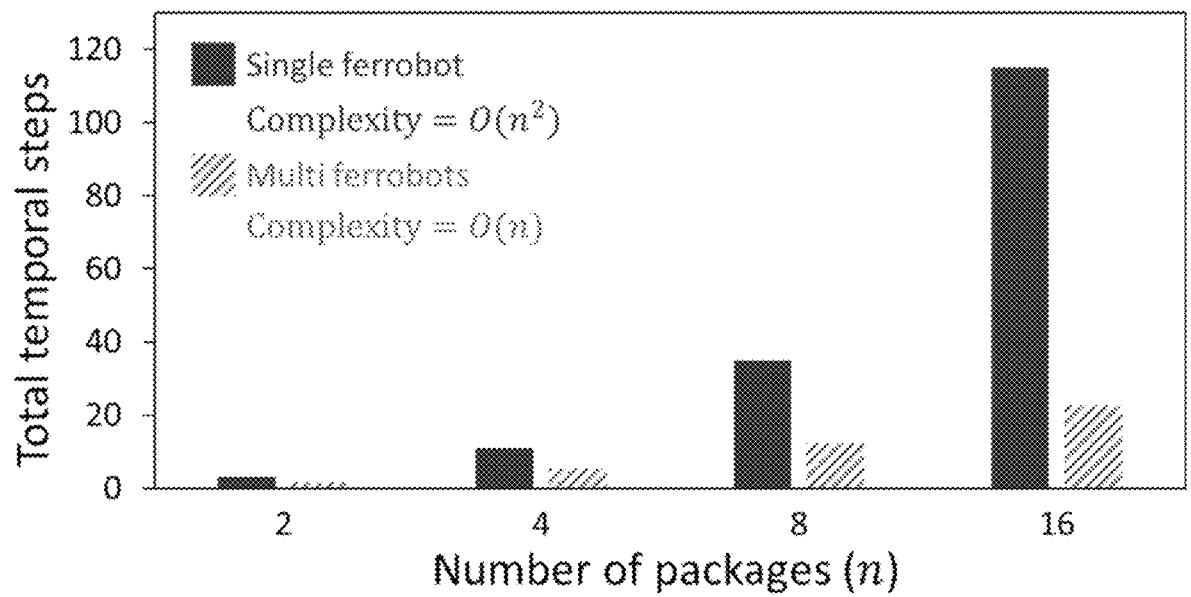
FIG. 6D is a graph showing the total temporal unit steps required for sorting 2, 4, 8, and 16 ferrofluid volumes (based on statistical averaging of all the possible permutations).
Figure 6E:
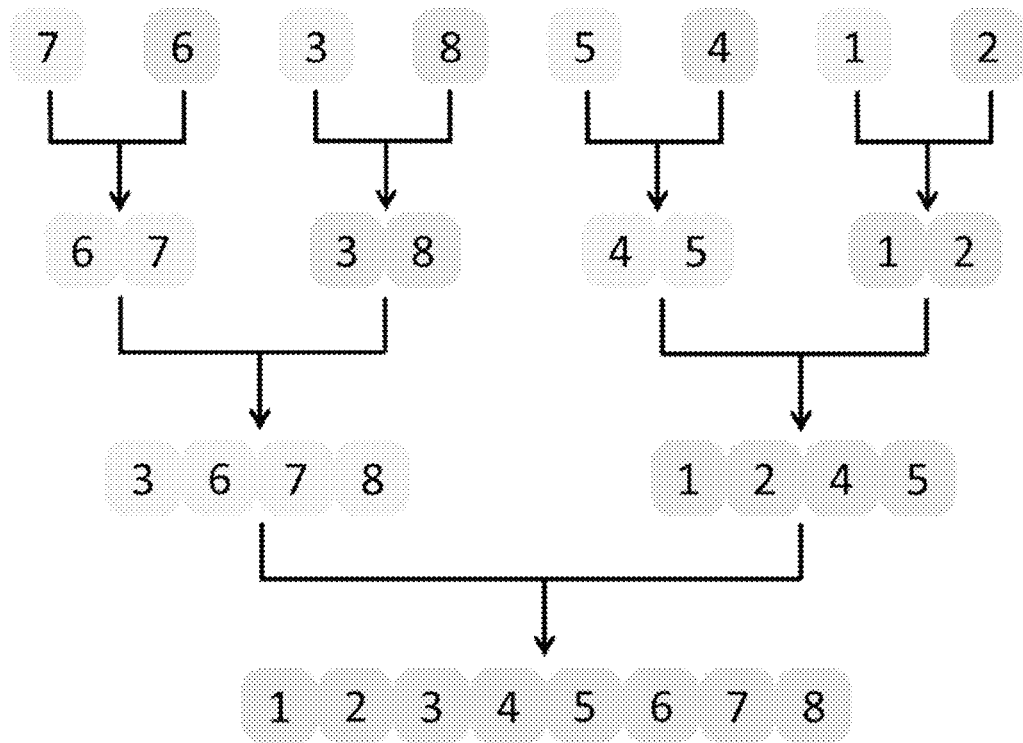
FIG. 6E illustrates a schematic of the application of recursive merge sort algorithm to sort an array of 8 integers.

When multiple ferrobots 34 are deployed (FIG. 6C), each ferrobot 34 is charged with moving one volume of ferrofluid, and they can move in parallel with other ferrobots 34 during the same state (following the computationally derived navigation plan in accordance with the "merge sort" algorithm, FIG. 6E). The corresponding experiment is visualized in FIG. 6C (right panel). In this scenario, the number of temporal steps for each state is determined by the maximum steps taken by a ferrobot 34 within the team, because the ferrobots 34 are delivering packages in parallel. For example, referring to FIG. 6C, in state 2, among 8 ferrobots 34, one ferrobot 34 moves 0 steps, two ferrobots 34 move 3 steps, and five ferrobots 34 move 4 steps, yielding 4 temporal steps for that state. The total number of temporal steps to achieve the sorting objective is also equal to the sum of temporal steps for each state, which is 13 for the illustrated example. By comparison, for this illustrative example, sorting using multiple ferrobots 34 results in about 300% increased efficiency as compared to the single ferrobot 34 case. This degree of improvement achieved due to the deployment of a cross-collaborative network of ferrobots 34 will be even higher for the cases requiring sorting of a larger number of packages (i.e., larger n). That is because, the complexity of the mission at hand for the case of a single ferrobot increases as $O(n^2)$, while for the case of multiple ferrobots it increases linearly (i.e., $O(n)$). To reinforce this point, as shown in FIG. 6D the total temporal unit steps were derived for the cases of n=2, 4, 8, and 16, based on statistical averaging of all the possible permutations (consistent with the trend observed when simulating 10,000 randomly generated sequences of n packages). Altogether, the results presented within the framework of this generalizable objective illustrate the utility of the deployment of a network of ferrobots 34 to achieve the objective at hand efficiently as well as the suitability of the ferrobotic system for microfluidic logistics.

Pipeline for Automated MMP Measurements from Human Physiological Samples

Figure 7A:
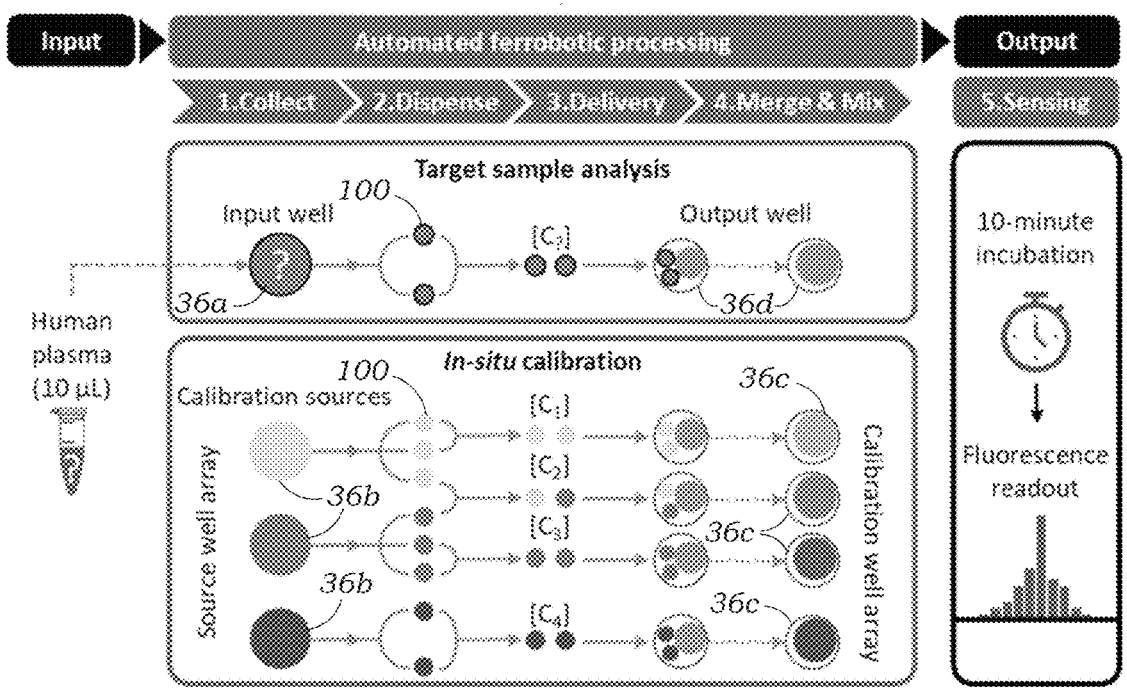
FIG. 7A illustrates an exemplary workflow of the MMP assay equipped with a dynamic self-calibration mechanism.

Five parallel pipelined MMP assays are performed on a prototype fully automated ferrofluidic fluid handling device 10 following the workflow shown in FIG. 7A. Five 4 μL droplets of FRET (Fluorescence Resonance Energy Transfer) based MMP detection substrate are preloaded into five (5) different detection wells (four wells 36c for calibration and one well 36d for the sample), while one 10 μL droplet each of a ferrofluidic mixture of samples containing negative control (PBS), positive control (solution of known collagenase concentration), and human plasma are first pipetted into four (4) different inlet reservoirs 36a, 36b. FIG. 7E illustrates how the FRET pair from the MMP substrate is cleaved by the MMPs present in the sample to yield a fluorescent product that is no longer quenched (EX: excitation light; EM: emission light).

Using the ferrofluidic fluid handling device 10, each sample droplet is distributed to an array of dispensers 36g creating multiple 2 μL droplets 100c, and then these 2 μL droplets 100c are delivered either to the detection wells 36c, 36d or to the waste area 36e. Each detection well 36c, 36d receives a total of two 2 μL droplets 100c, either from the same plasma sample, or from a combination of negative and positive controls to form a calibration gradient. The droplets 100c delivered to the five (5) detection wells 36c, 36d are electrically coalesced with merging electrodes 60 with the preloaded MMP detection substrate all at one time, so that the reactions in the five (5) detection wells 36c, 36d commence simultaneously. To achieve a homogenous mixture after merging, ferrobot $F_2$ can induce a chaotic internal flow. The generation of fluorescent signals are tracked by a fluorescence microscope 110. The logistics to rapidly perform this assay pipeline is illustrated in 7D.

A pipeline for three (3) ferrobots 34 (a dispensing ferrobot, and two delivery ferrobots) was also shown to act collaboratively at an elevated efficiency. Tasks including droplet 100 dispensing, sample delivery and waste disposal are assigned to three separate permanent magnets 34. Under the guidance of the control unit, three permanent magnets 34 work simultaneously, and keep a distance from each other to avoid the influence of the magnetic field exerted by the other magnets 34. Following the delivery and partitioning of a first 10 μL sample droplet by a dispenser, the divided 2 μL parcels are taken over by 2 delivery ferrobots 34 destined respectively for the detection well and the waste area, while the dispenser ferrobot 34 immediately returns to collect the next 10 μL parcel for partitioning. The resulting assembly schedule improves the overall time efficiency by 61%.

Figure 7B:
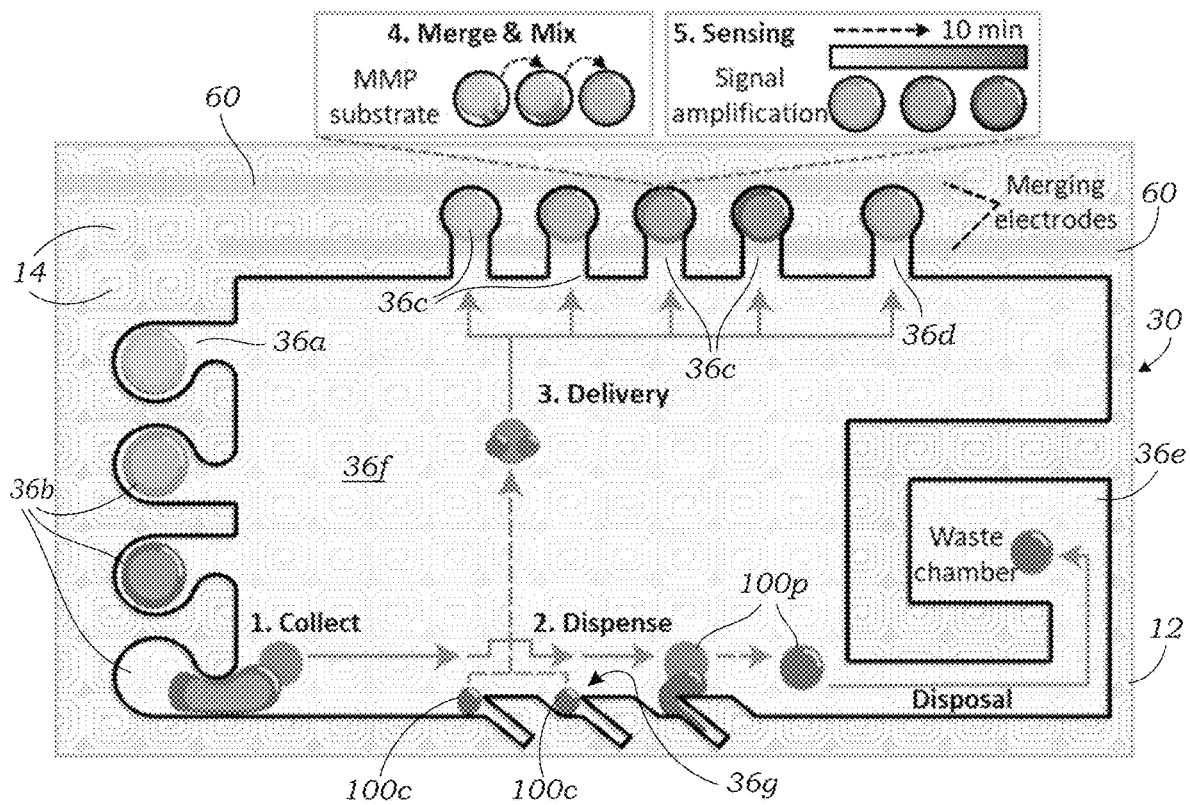
FIG. 7B illustrates the ferrobotic tasks in relation to the PCB (navigation floor) over the processing of a representative sample (performed by three (3) ferrobots).
Figure 7C:
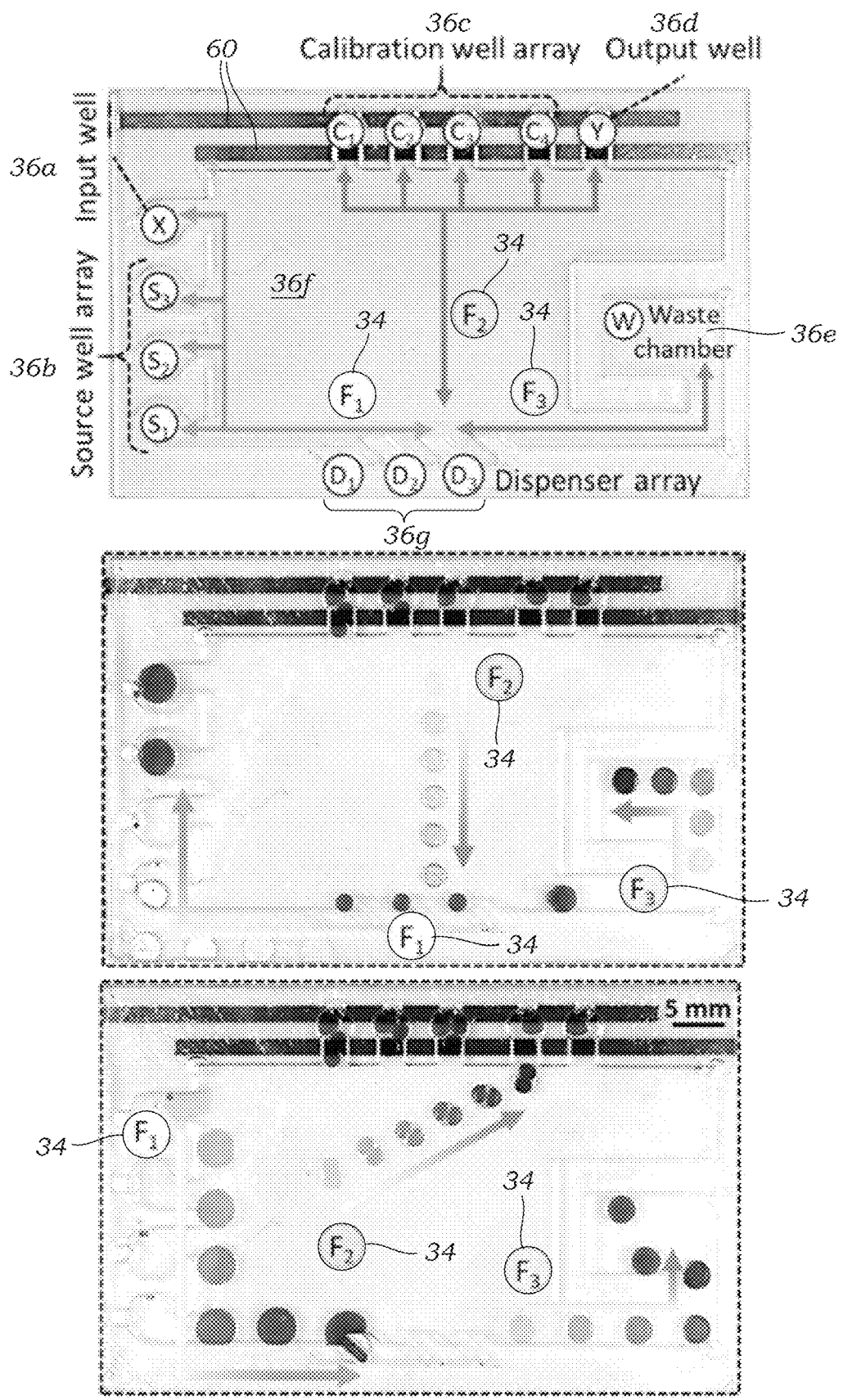
FIG. 7C illustrates an overview of the navigation plans of the three deployed ferrobots ($F_1$, $F_2$, and $F_3$) with annotated locations of interest.
Figure 7D:
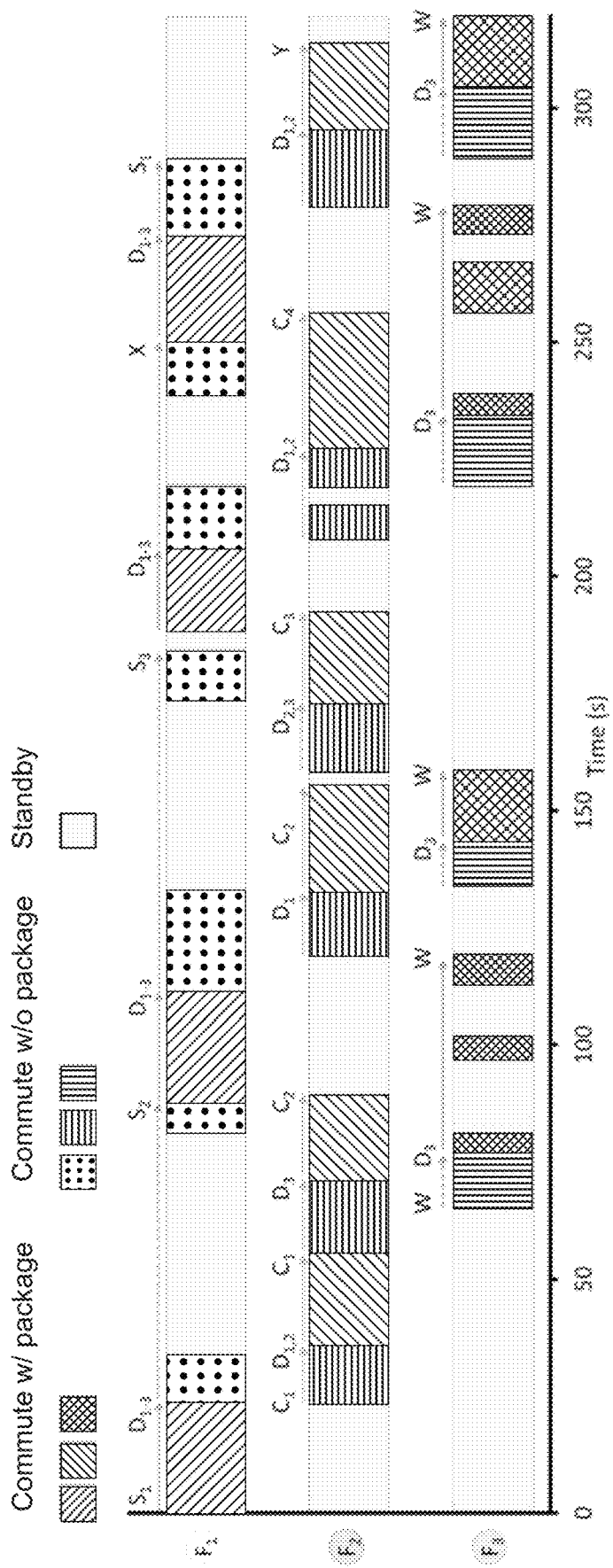
FIG. 7D illustrates the detailed timeline of the ferrobots' status (commuting with/without package, standby), with annotated locations of interest. Overlaid sequential video frames illustrating the status at two representative stages (FIG. 7C).
Figure 7E:
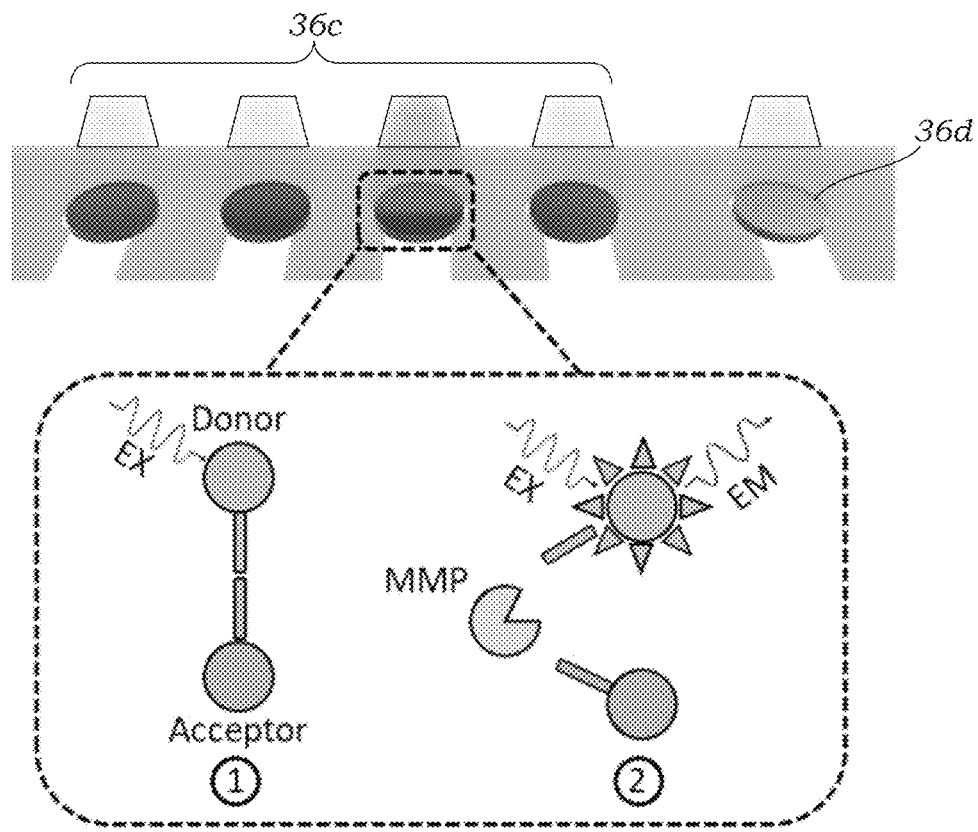
FIG. 7E is a schematic illustration of the FRET pair from the MMP substrate cleaved by the MMPs present in the sample to yield a fluorescent product that is no longer quenched (EX: excitation light).
Figure 7F:
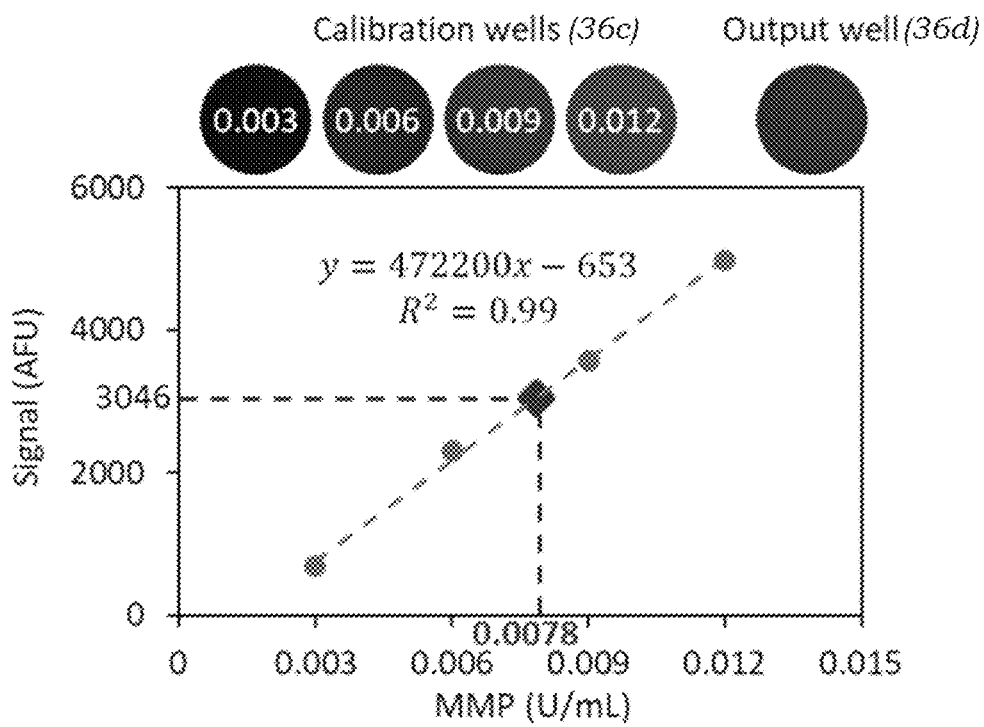
FIG. 7F is a graph showing the fluorescent readouts from the calibration and output wells, after automated ferrobotic processing and 10 minutes of incubation. The concentration of MMP in the test sample is estimated with the aid of a real-time calibration standard curve generated from the four (4) calibrator samples (estimated: 0.0078 U/mL vs. expected: 0.008 U/mL).
Figure 7G:
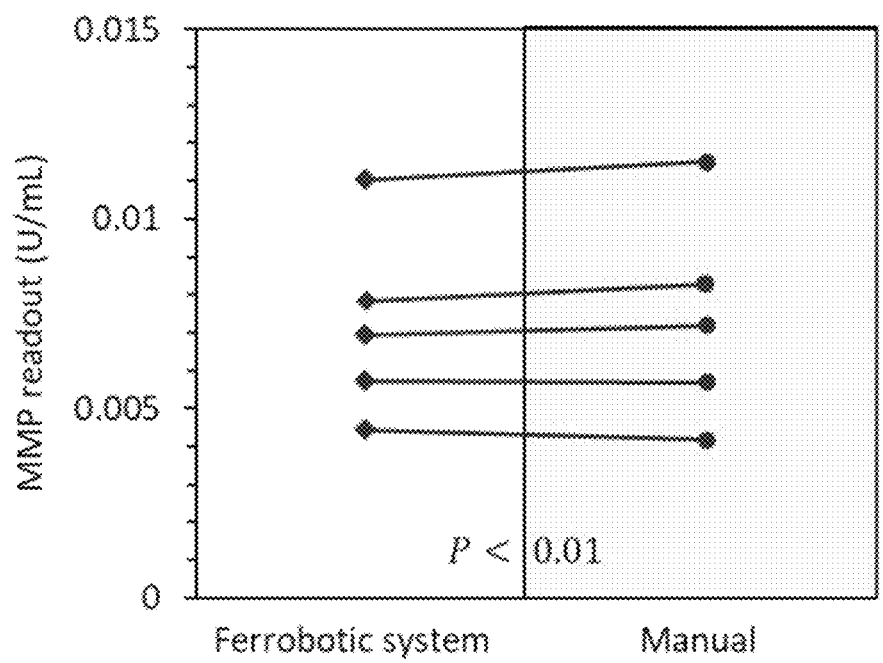
FIG. 7G shows the estimated MMP concentrations in five tested human plasma samples (performed by the ferrofluid fluid handling device and manually by a technician, $p<0.01$).
Figure 7H:
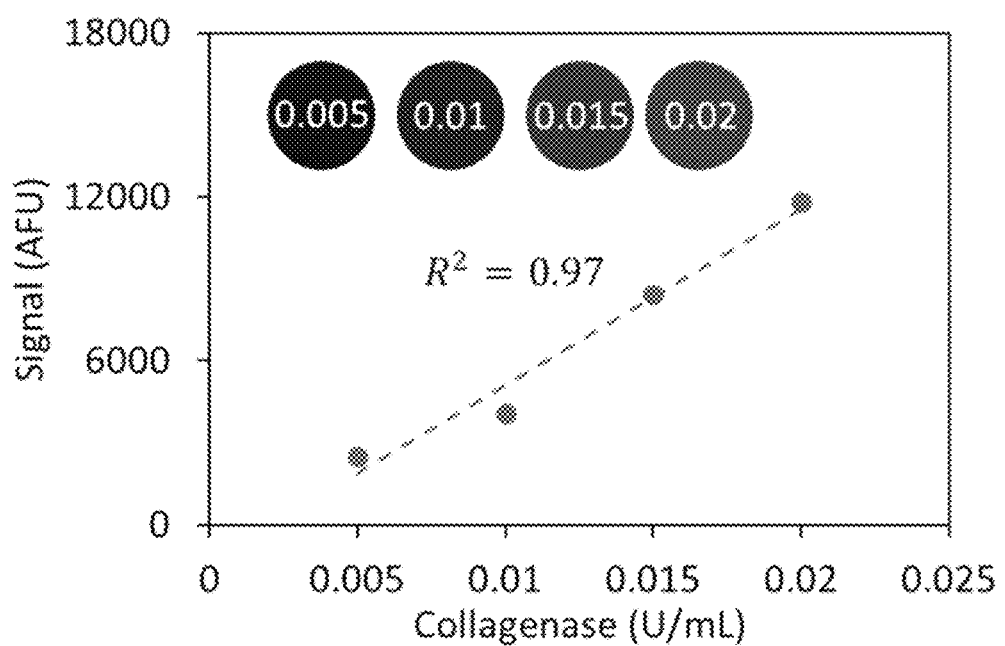
FIG. 7H illustrates the recorded fluorescence signals from the calibration well array for the MMP assay, where each well contains PBS dilutions of collagenase at different end concentrations.

The linearity of the fluorescent signals with the MMP content of a sample was validated by spiking collagenase in a phosphate-buffered saline (PBS) buffer at different levels and reading out fluorescence after a 10 min incubation (FIG. 7H). To evaluate the analytical accuracy of the ferrobotic assay for measuring the MMP content in human plasma, four calibrator samples with collagenase concentration of 0.003, 0.006, 0.009, 0.012 Wunsch U/mL were used to determine the MMP concentration of a test sample (human plasma spiked with MMP at a collagenase concentration of 0.008 U/mL). As illustrated in FIG. 7F, by referring to the real-time standard curve generated by the calibrator samples, the test sample MMP content was measured to be 0.0078 U/mL±0.0005 U/mL (based on 95% confidence interval). To further evaluate the analytical performance of the ferrobotic assay, four additional test samples were analyzed by the ferrofluidic fluid handling device 10, as well as by a technician using manual pipetting steps and a plate reader. As shown in FIG. 7G, the readouts obtained from the ferrofluidic fluid handling device 10 closely matched those analyzed using standard manual analysis (P<0.01), which in turn illustrates the successful execution of all ferrobotic instructions with a high degree of and robustness and precision. This pipelined assay exemplifies the capacity of the ferrofluidic fluid handling device 10 to perform highly quantitative biochemical processes with a high level of integration and automation.

Additional assays can also be performed in the ferrofluidic fluid handling device 10 system based on the operations of merging, splitting, diluting, incubating, filtering, and mixing. Another example assay is a cell-based assay in which cells from a patient sample below a cut-off size (e.g., bacterial cells) are filtered from other larger cells (e.g., blood cells) through the filter unit operation. The bacterial cells filtered into a ferrofluidic droplet 100 are then split into a number of smaller droplets 100c. Each of these droplets 100c is merged with another droplet 100 containing growth media with different antimicrobials and at different concentrations. The merged droplets 100 location is tracked to note the particular antimicrobial and concentration and are incubated over 30 minutes to 24 hours to grow bacteria. The bacteria are then optionally stained (e.g., live dead fluorescent stain) and imaged to determine in which droplets growth occurred and to determine antibiotic susceptibility of the sample. Another example assay that the ferrofluidic fluid handling device 10 can perform is nucleic acid amplification or a nucleic acid amplification test (NAAT). First a sample (e.g., from a patient, environmental sample, food sample, research sample) can be mixed with ferrofluid and added to the ferrofluidic fluid handling device 10 where unit operations are performed. A first filtering unit operation can be optionally performed to remove large debris and/or cells. The filtered sample in ferrofluid can then be diluted with a reaction buffer to remove matrix effects by merging with one or more ferrofluid droplets 100. The diluted sample can then be split into a number of droplets 100 to perform parallel reactions or meter out a volume for reactions. The split droplets 100c can be merged with reagent containing ferrofluid droplets 100 (e.g., reagents for polymerase chain reaction, loop-mediated isothermal amplification or other isothermal nucleic acid amplification approaches). Reagents can include polymerases, primers, dNTPs, optional intercalating dyes, all in buffer with salts. The merged droplets can be mixed using the unit operation that moves the ferrofluid droplet cyclically. Cycles of e.g., PCR amplification can be performed from moving the mixed ferrofluid droplet back and forth between separate zones on the ferrobotic system containing the hot and cold temperatures necessary for melting, and annealing, and extension. These hot and cold zones can be controlled using resistive heaters and temperature sensors incorporated in the PCB layer or other microfluidic layers of the ferrofluidic fluid handling device. Alternatively, the temperature on the system can be cycled with time. Intensity of fluorescence can optionally be measured after each cycle or during continuous amplification. Alternatively, electrochemical sensing can be performed on the ferrofluidic droplet 100 by moving the droplet to a sensing electrode 62. A number of enzymatic reactions and assays (e.g., enzyme-linked immunosorbent assays using horse radish peroxidase, galactosidase, proteases, esterases, ligases, helicases, or related enzymes) can also be performed in the biocompatible ferrofluid. Generally, both optical assays and/or electrochemical assays can be performed on the ferrofluidic fluid handling device 10 given the magnetic actuation mechanism which is orthogonal to these detection modalities.

MATERIALS AND METHODS

Materials for the Ferrobotic System

The ferrofluid used in this work refers to ferumoxytol, an FDA approved intravenous iron preparation also referred to as Ferraheme (AMAG Pharmaceuticals, MA, USA). Rare earth permanent magnets (D101, 0.8 mm thickness and 2.54 mm diameter) was purchased from K&J Magnetics (PA, USA). All microfluidic devices 30 were filled with fluorinated oil (Novec 7500 Engineered Fluid, 3M, MN, USA) containing 0.1% biocompatible surfactant (Pico-Surf 1, Sphere Fluidics, NJ, USA). The design and fabrication of the microfluidic devices and the electromagnetic navigation floor are described in detail below.

Fabrication and Assembly of the Microfluidic Chamber

Different functional microfluidic modules were created by assembling several layers of double-sided tape (170 μm-thick, 9474LE 300LSE, 3M, MN, USA) and transparent polyethylene terephthalate (PET) film sheets (416-T, MG Chemicals, B.C., Canada). Microchannels and vias (i.e., holes passing vertically through the sheets) were created by laser-cutting (VLS 2.30, Universal Laser System, AZ, USA) 2D patterns within the tape- and the PET substrates. Through the alignment of vertical vias and microchannels, fluidic connections in both horizontal and vertical directions were achieved, rendering functional 3D microfluidic structures. In some devices, PET sheets were selectively patterned with gold electrodes prior to assembly. The electrodes were fabricated on PET substrates by photolithography using positive photoresist (AZ5214E, MicroChemicals, Germany), followed by the evaporation of 20 nm Cr, 100 nm Au. After deposition, a lift-off step was performed in acetone.

Electromagnetic Field Simulation

To investigate and model the effect of an intermediary permanent magnet on amplification of the actuation magnetic field, finite element analysis (COMSOL Multiphysics 5.2, MA, USA) was used to perform electromagnetic simulations. In the simulation setup, magnetic and electric field physics were employed in an air environment. The simulation used the same EM coil 14 and permanent magnet dimensions as the experimental setup. The magnetization of the permanent magnet was set according to the product description (278.9 kA/m in axial direction), and the intensity of actuation for the DC current was set as 0.2 A. The magnetic flux density profile was generated on the x-z plane.

Electromagnetic Navigation Floor and Row/Column Selection on PCB

The electromagnetic navigation floor 12 on the PCB comprised an active matrix array of 32×32 electromagnetic coil elements 14. Each coil 14 had a 3-turn coil with a size of 1.5×1.5 mm stacked on three layers. Adjacent coils 14 were separated by a gap of 0.1 mm, altogether, giving a total active area of the navigation floor 12 of 51×51 mm.

Each coil element 14 can be activated when powered by a 0.2 A current, generating a localized magnetic force that attracted the permanent magnet 34. The specific coil 14 selection was achieved by programming power switch ICs 16a, 16b, including MAX14662 (Maxim Integrated, CA, USA) for row selection and MC33996 (NXP semiconductor, Netherlands) for column selection in the navigation floor. The target electromagnetic coil 14 was selectively actuated when the corresponding row and column lines of its coordinate were activated by switch ICs 16a, 16b. Switch ICs 16a, 16b were linked by serial peripheral interface (SPI) wires to Arduino Nano MCU 18, which communicated with a computing device 20 (i.e., personal computer) through serial communication. Target coordinates pre-programmed or sent from the user interface in the PC 20 were translated to SPI commands by the MCU 18, then transmitted to switch ICs 16a, 16b for addressable activation of the EM coils 14.

The navigation floor 12 was powered by an external power supply 19 (Keithley 2230-30-1, Tektronix, OR, USA). A DC current source was used for EM coil activation, and the total current I followed the equation: I=0.2 A×N (N is the number of activated coils).

Velocity Characterization

A microfluidic device 30 with a 40×40×1.5 mm inner chamber 36 was fabricated, assembled and filled with oil. The device 10 was placed 2 mm above the navigation floor 12. A permanent magnet 34 was placed on top of the navigation floor 12 and below the microfluidic device 30.

Ferrofluid droplets 100 with volume gradients of 0.5-10 µL (0.5, 1, 2, 4, 6, 8, 10 µL) and two different concentrations, (100% and 50% ferumoxytol dilution in DI water) were loaded in the microfluidic chamber 30. These droplets 100 moved along with the permanent magnet 34, which was guided by the EM coils 14 actuation in one row from left (y=1) to right (y=32) sequentially. The velocity of the permanent magnet 34 was controlled by adjusting the time interval between activating two adjacent coils 14. If the ferrofluid droplet 100 followed the permanent magnet 34 to the end successfully, the velocity of the permanent magnet 34 would increase by shortening the actuation time interval (by 1 ms) in the next round, until the droplet 100 failed to follow the magnet 34.

Characterization of the Long-Term and Oscillatory Ferrobotic Transportation

A microfluidic device 30 with a 20×20×0.7 mm chamber 36 was fabricated and assembled, with a pair of gold electrodes 62 deposited on the substrate as an impedance sensor. A 2 µL ferrofluid droplet 100 was loaded in the oil-filled microfluidic chamber 36. A permanent magnet 34 was actuated to carry the droplet 100 back-and-forth between two locations periodically (0.1 Hz). In each cycle, the droplet 100 was first carried away from the sensing electrodes 62, consequently raising the impedance signal, then carried back in contact with the electrodes 62 causing the impedance signal to drop. These actions were repeatedly is performed for over 100,000 seconds in order to finish 10,000 cycles. The electrodes 62 were connected to a potentiostat (CH Instrument 660E, TX, USA) and impedance (at 1 kHz) was measured between the two electrodes 62.

Droplet Dispensing Set-Up and Procedure

Microfluidic devices 30 (20×40×0.7 mm) with a corrugated wall 36g on one side were fabricated and assembled. Six devices with same corrugated opening length (3 mm), and different opening width (0.4, 0.6, 1.0, 1.2, 1.4, and 1.8 mm) were tested. A 10 µL parent ferrofluid droplet 100p was loaded in each microfluidic device 100 and filled with oil. During the experiment, the parent ferrofluid droplets 100p were transported along the corrugated structures, leaving dispensed droplets 100c in corrugated openings. The sizes of the five dispensed droplets 100c were measured through image analysis.

Droplet Generation Setup and Procedure

Multi-layer microfluidic devices 30 with a vertical orifice 42 junction in the middle PET layer (800 µm above the bottom surface) were fabricated and assembled. Different vertical orifices 42 were fabricated by laser cutting and measured under the microscope, resulting in diameters from 80 µm to 310 µm. A 4 µL parent ferrofluid droplet 100p was loaded in the upper layer of the microfluidic device 10. During the experiment, the droplet 100p was transported to the vertical orifice 42 junction by permanent magnet 34 and stayed static for 4 seconds. The diameters of the generated small droplets 100c were measured under a microscope, and volumes were calculated based on the equation of a sphere (i.e., $v=4/3\pi r^3$). The number of droplets 100c was counted for generation rate characterization.

Droplet Merging and Mixing Setup and Procedure

A microfluidic device 30 with patterned electrocoalescence electrodes 60 (Area: 2 mm×2 mm, spaced 1 mm apart; thickness: 20 nm Cr and 100 nm Au) on the PET substrate was fabricated and assembled. Two 2 µL ferrofluid droplets 100 (10% ferumoxytol solution containing either green or red food dye) were loaded in the oil-filled device 10. The permanent magnet 34 delivered the two droplets 100 at the vicinity of the actuation electrode 60. 2 V DC voltage was applied between the two electrodes 60, causing the droplets 100 to merge. Afterwards, the permanent magnet 34 either kept the droplet 100 static (shown as the w/o active mixing condition in FIG. 5L), or induced chaotic motion by the actuated neighboring electromagnetic coils 14 within the confines of the coil's coordinates at a frequency of 10 Hz in a cyclic fashion (shown as the w/active mixing condition in FIG. 5L). A video recording was taken of the merging process, and the level of mixing was calculated through image processing using MATLAB software as discussed below.

Mixing Index Calculation Through Image Analysis

Figure 5M:
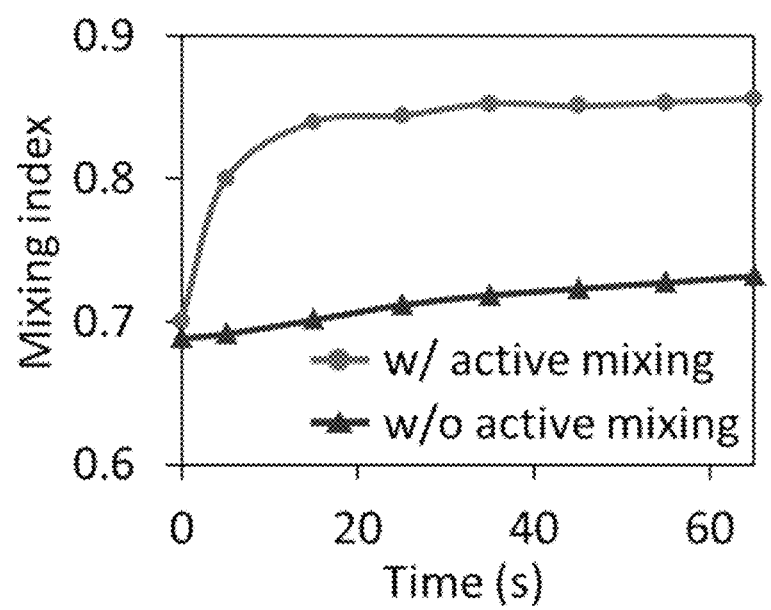
FIG. 5M is a graph showing the comparison of the progressive mixing index for the two cases of with and without active mixing.

To quantify mixing efficiency, the merging of two volumes of ferrofluid with different colors (red food dye and green food dye in 2 µL 10% ferrofluid droplet) was characterized with or without active mixing (FIG. 5M). The microfluidic region containing merged droplet 100 was video-recorded, and the corresponding video frames were imported into a MATLAB (Mathworks, MA, USA) in [R, G, B] vector format. Image analysis was performed at droplet region. A mixing index was defined, as expressed below:

$$\text{Mixing index} = 1 - \sqrt{\frac{1}{N-1}\sum_{i=1}^{N}\frac{(c-c_{ave})^2}{c_{ave}^2}}$$

where N, $c_i$, and $c_{ave}$ are the total number of pixels, the RGB values at pixel i, and the average RGB values over N pixels, respectively.

Ferrofluid Volume Sorting Set-Up and Procedure

To implement the sorting of multiple ferrofluidic volumes, a PCB navigation floor 12 was fabricated, comprising of an array of EM coils 14 (9 rows and 120 columns) and switch ICs 16a, 16b. A microfluidic device 30 with a 20×120×0.8 mm inner chamber was fabricated, assembled and filled with oil. Eight ferrofluid droplets 100 of different volumes (sequentially increasing from 0.5 µL to 4 µL) were loaded into the chamber 30 and lined in a random order. One permanent magnet 34 was placed under each ferrofluid droplets 100. A top-view image of droplets 100 was acquired and processed by a MATLAB script to identify the droplet sizes and positions, followed by the computation of a navigation plan according to the "merge sort" algorithm. An on-board microcontroller 18 implemented the navigation plan, which it received through serial communication, by actuating the EM coils 14 according to derived trajectories. The design of the navigation plan took into consideration the maintenance of an inter-permanent magnet 34 distance of 11 mm (7 electromagnetic coils apart) to avoid inter-permanent magnet 34 magnetic interference.

Sample Filtration Setup and Procedure

A microfluidic device 30 with a circular polycarbonate membrane 44 incorporated in the top layer (PCTF10047100, Sterlitech, WA, USA) was fabricated and assembled. Monodisperse polystyrene microspheres 106 (25 µm-diameter, 24811-2, Polybead, PA, USA) were added in the ferrofluid solution for the experimental characterization of filtration. The sample was diluted from an initial concentration (5.69×10$^6$ beads/mL) to 8×10$^4$ beads/mL by ferrofluid. At the start, 1 µL of the bead-containing sample was dropped on the filter membrane 44. Then, the permanent magnet 34 moved to the droplet 100, located under the membrane region, and remained there for about 10 seconds until the entire droplet 100 passed through the filter 44. The number of beads 106 was counted under the microscope before and after filtration (FIG. 5J).

Pipelined and Automated Bioassay (MMP Assay)

A microfluidic device 30 with an input well 36a, a source well array, 36b, a dispenser array 36g, a waste chamber 36e, a pair of electrocoalescence electrodes 60 (patterned across all the detection wells 36c, 36d), a calibration well array 36c, and an output well 36d was fabricated and assembled as shown in FIGS. 7B and 7C. Three human plasma samples 7.2 µL each, spiked respectively with 0.003, 0.009, and 0.012 U/mL collagenase (Collagenase/Dispase, Sigma-Aldrich, MO, USA), were each mixed with 0.8 µL of ferrofluid and preloaded in the source well array 36b. 4 µL of 10% (v/v) diluted MMP substrate (MMP Red substrate, AAT Bioquest, CA, USA) in PBS containing 2% (v/v) ferrofluid was preloaded into each of the calibration wells 36c and the output well 36d. The rest of the microfluidic device 30 was filled with oil. 8 µL of a test sample (a mixture of 0.8 ferrofluid and 7.2 µL human plasma spiked with collagenase at an arbitrary concentration) was pipetted into the input well 36a. Thereafter, three permanent magnets 34 ($F_1$, $F_2$, $F_3$) collaboratively performed the sample processing steps of collection, dispensing, delivery and disposal for each source and test sample. It is worth noting that during the sample droplet transportation, on rare occasions, miniscule fractions of the sample break free as satellite droplets, but this artefact could be ignored, because the fractions constituted less than 0.5% of the original droplet volume (based on image analysis). Each calibration well 36c or output well 36d ended up receiving two droplets 100 of the samples, respectively from either the calibration source or the test sample. In-situ construction of a calibrator sample was achieved through delivering two different calibration source droplets 100 into one calibration well 36c (e.g., in calibration well #2, 0.006 U/mL collagenase would be made by delivering one 0.003 U/mL droplet and one 0.009 U/mL droplet). To merge the delivered droplets 100 with the preloaded MMP substrate, a voltage of 2 V was applied across the electrocoalescence electrode pair 60. After 10 minutes of incubation, the array of calibration wells 36c and the output well 36d were imaged using a Nikon Ti-E fluorescence microscope equipped with a Photometrics Prime sCMOS camera (TRITC channel, 1 s exposure). Images were processed using ImageJ and MATLAB software to quantify the mean fluorescence intensity in the regions of interest.

MMP Quantification with a Conventional Well Plate Reader

For MMP measurements using a conventional well plate reader, 100 µL of calibration and test solutions (a mixture of 50 µL human plasma spiked with collagenase of various concentrations matching the corresponding ferrobotic experiments, and 50 µL of a 1% MMP substrate diluted in PBS). The measurements were performed by a BioTek Cytation 5 Imaging Reader using $\lambda ex=540/20$ nm, $\lambda em=590/20$ nm for 2 hours with lids on.

Human Plasma Sample

All blood samples were obtained following University of California, Los Angeles, IRB-approved protocol IRB #11-001120 and de-identified. Upon collection, blood was centrifuged at Eppendorf 5417R Refrigerated Centrifuge and the supernatant was frozen at −20° C. in small aliquots until used.

The ferrofluidic fluid handling device 10 and system disclosed herein shows robust basic transportation functionality of nano- and microscale cargo over 24 hours of continuous operation. The contactless fluid manipulation and non-interfering magnetic-field operations of the "ferrobotic" mechanism enabled advanced functionality such as droplet generation, dispensing, merging, and filtration. Additionally, the programmable navigation floor allows the system to employ a network of individually addressable moveable magnets 34 to achieve cross-collaborative objectives such as droplet sorting with exponential time savings, further demonstrating the potential for teamwork different applications. The exemplary MMP bioassay implemented through the ferrofluidic fluid handling device 10 verified the bioassay compatibility of the device 10 and use for automating analytical processes for biological and chemical applications. While fluorescence was used in the MMP assay it should be understood that colorimetric analysis or other modes of optical interrogation or sensing may be employed in the ferrofluidic fluid handling device 10.

While embodiments of the present invention have been shown and described, various modifications may be made without departing from the scope of the present invention. For example, while the device and methods have particular application for microfluidic devices, different sized or scaled fluidic handling device may be used including those that handle volume sizes ranging from microfluidic volumes to millifluidic volumes. The invention, therefore, should not be limited, except to the following claims, and their equivalents. The following publication is incorporated herein by reference: Wenzhuo Yu et al., A Ferrobotic System for Automated Microfluidic Logistics, Science Robotics, Vol. 5, Issue 39, eaba4411 February 2020 (including Supplementary Information).

What is claimed is:

1. A ferrofluidic fluid handling device comprising:
   a first substrate defining a navigation floor and having a plurality of individually addressable coils formed therein or thereon across x and y dimensions;
   a second substrate comprising one or more channels, chambers, regions, zones, or wells formed therein and disposed to above the first substrate and separated by a gap region having a height;
   one or more permanent magnets interposed in the gap region formed between the first substrate and the second substrate, the one or more permanent magnets having respective heights less than the height of the gap region; and
   a power source and control circuitry electrically connected to the individually addressable coils;
   wherein the one or more permanent magnets are moveable laterally over the navigation floor in the x and y directions in response to actuation of the individually addressable coils.

2. The device of claim 1, wherein the first substrate comprises a printed circuit board (PCB) having a matrix of individually addressable coils formed therein or thereon.

3. The device of claim 2, wherein each individually addressable coil comprises a multi-layered spiral disposed in the PCB.

4. The device of claim 1, wherein the second substrate comprises an upper chamber fluidically coupled to a lower chamber by one or more vias or holes.

5. The device of claim 1, further comprising one or more volumes of ferrofluid contained in the one or more channels, chambers, regions, zones, or wells, the ferrofluid comprising magnetic particles contained therein.

6. The device of claim 1, wherein the one or more channels, chambers, regions, zones, or wells comprises a corrugated wall.

7. The device of claim 6, wherein the corrugated wall comprises a plurality of uniformly dimensioned openings formed in a wall of the one or more channels, chambers, regions, zones, or wells.

8. The device of claim 1, wherein the one or more permanent magnets are dimensioned in a lateral direction to cover or at least partially overlap one or more of the individually addressable coils.

9. The device of claim 1, wherein the one or more permanent magnets comprise rare earth magnets, a metallic material, or composite magnetic material.

10. The device of claim 1, wherein the one or more channels, chambers, regions, zones, or wells are enclosed.

11. The device of claim 1, wherein the one or more channels, chambers, regions, zones, or wells are open.

12. The device of claim 1, wherein the one or more channels, chambers, regions, zones, or wells are fluidically coupled to a plurality of separate chambers or wells.

13. The device of claim 1, further comprising an optical interrogation device configured to image the one or more channels, chambers, regions, zones, or wells of the second substrate.

14. The device of claim 1, wherein the one or more channels, chambers, regions, zones, or wells comprises an oil therein.

15. The device of claim 1, wherein the control circuitry comprises a microcontroller unit (MCU).

16. The device of claim 15, further comprising a computing device in communication with the MCU and comprising software executed by one or more processors that contain a program for the sequence and timing of actuation of the individually addressable coils.

\* \* \* \* \*